United States Patent
Frohlich et al.

(10) Patent No.: US 10,313,113 B2
(45) Date of Patent: Jun. 4, 2019

(54) QUANTUM COMMUNICATION SYSTEM AND A QUANTUM COMMUNICATION METHOD

(71) Applicant: Kabushiki Kaisha Toshiba, Minato-ku (JP)

(72) Inventors: Bernd Matthias Frohlich, Cambridge (GB); Zhiliang Yuan, Cambridge (GB); Andrew James Shields, Cambridge (GB)

(73) Assignee: Kabushiki Kaisha Toshiba, Minato-ku (JP)

( * ) Notice: Subject to any disclaimer, the term of this patent is extended or adjusted under 35 U.S.C. 154(b) by 821 days.

(21) Appl. No.: 14/816,293

(22) Filed: Aug. 3, 2015

(65) Prior Publication Data

US 2016/0234018 A1 Aug. 11, 2016

(30) Foreign Application Priority Data

Feb. 5, 2015 (GB) .................................. 1501945.8

(51) Int. Cl.
*H04L 9/08* (2006.01)
*H04J 14/00* (2006.01)
*H04B 10/70* (2013.01)

(52) U.S. Cl.
CPC ............ *H04L 9/0852* (2013.01); *H04B 10/70* (2013.01); *H04J 14/00* (2013.01)

(58) Field of Classification Search
CPC ........ H04J 14/00; H04J 14/02; H04J 14/0202; H04J 14/0204; H04J 14/022;

(Continued)

(56) References Cited

U.S. PATENT DOCUMENTS 8,582,769 B2 * 11/2013 Zhao .................... H04L 9/0852
380/256
2003/0063843 A1 4/2003 Horne
(Continued)

FOREIGN PATENT DOCUMENTS

CN 103118308 A 5/2013
CN 103929251 A 7/2014
(Continued)

OTHER PUBLICATIONS

Combined Search and Examination Report dated Jul. 6, 2015 in United Kingdom Patent Application No. 1501945.8.

*Primary Examiner* — Daniel B Potratz
(74) *Attorney, Agent, or Firm* — Oblon, McClelland, Maier & Neustadt, L.L.P.

(57) ABSTRACT

In a quantum communication system, each transmitter unit has a source of quantum signals. A receiver unit has a quantum receiver with at least one detector configured to detect quantum signals; a first classical communication device; and a passive optical splitter. The transmitter units are optically coupled to the receiver unit through the passive optical splitter. The passive optical splitter is optically coupled to the quantum receiver through a first spatial channel and optically coupled to the first classical communication device through a second spatial channel. The first spatial channel and second spatial channel are separate spatial channels. The passive optical splitter is configured to distribute an inputted optical signal irrespective of its wavelength.

19 Claims, 17 Drawing Sheets

(58) Field of Classification Search
CPC .......... H04J 14/0228–14/0252; H04J 14/0278;
H04L 9/0852; H04L 9/0855
See application file for complete search history.

(56) References Cited

U.S. PATENT DOCUMENTS

| | | | |
|---|---|---|---|
| 2005/0275921 A1* | 12/2005 | Haus | G02B 6/125 359/247 |
| 2006/0045527 A1 | 3/2006 | Maeda et al. | |
| 2007/0133798 A1* | 6/2007 | Elliott | H04B 10/70 380/255 |
| 2009/0041407 A1 | 2/2009 | Silfvenius | |
| 2009/0074192 A1* | 3/2009 | Beal | H04L 9/0858 380/278 |
| 2010/0195965 A1 | 8/2010 | Sasaoka | |
| 2010/0290626 A1 | 11/2010 | Jenkins et al. | |
| 2010/0299526 A1* | 11/2010 | Wiseman | H04L 9/0855 713/171 |
| 2011/0085666 A1* | 4/2011 | Hicks | H04L 9/0852 380/278 |
| 2012/0177201 A1* | 7/2012 | Ayling | H04B 10/70 380/278 |
| 2012/0328290 A1 | 12/2012 | Yuan et al. | |
| 2014/0240819 A1* | 8/2014 | Tsuchida | G02B 6/02042 359/341.33 |
| 2014/0286648 A1 | 9/2014 | Buelow | |

FOREIGN PATENT DOCUMENTS

| | | |
|---|---|---|
| GB | 2492083 | 12/2012 |
| JP | 2005-532699 A | 10/2005 |
| JP | 2006-101491 A | 4/2006 |
| JP | 2008-543077 A | 11/2008 |
| JP | 2011-18013 A | 1/2011 |
| JP | 2013-13073 A | 1/2013 |
| WO | WO 2007/033561 A1 | 3/2007 |
| WO | WO 2007/041178 A2 | 4/2007 |

* cited by examiner

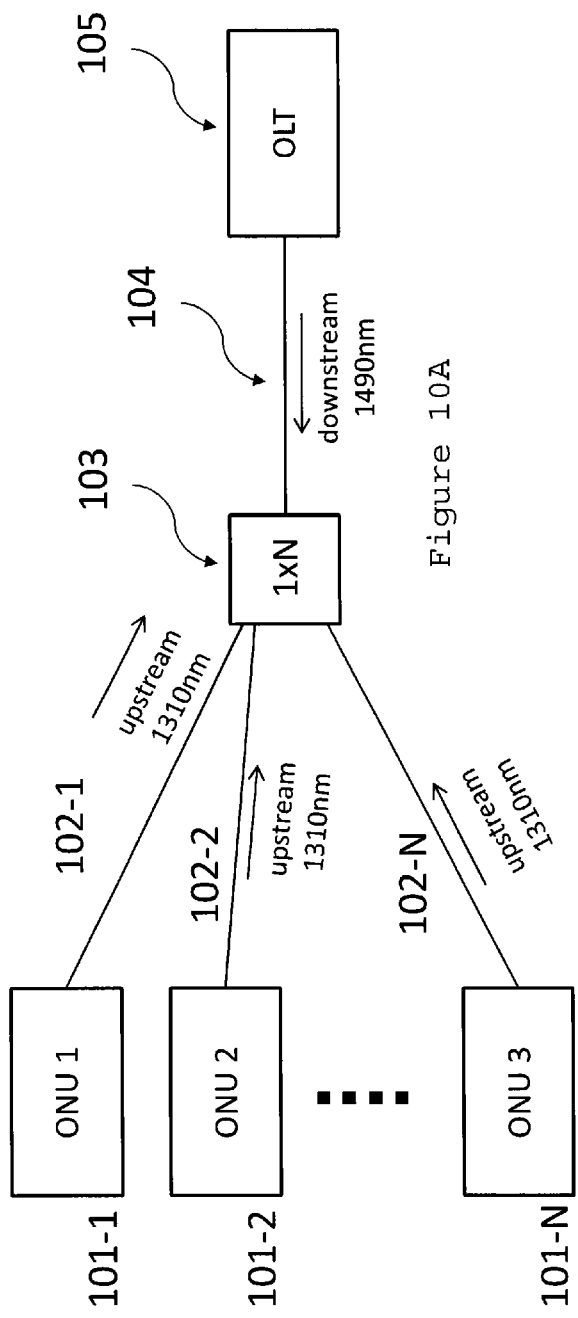
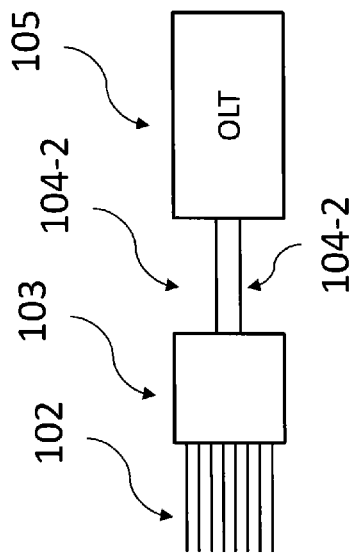

QUANTUM COMMUNICATION SYSTEM AND A QUANTUM COMMUNICATION METHOD

FIELD

Embodiments described herein relate generally to quantum communication systems, and quantum communication methods.

BACKGROUND

In a quantum communication system, information is sent between a transmitter and a receiver by encoded single quanta, such as single photons. Each photon carries one bit of information encoded upon a property of the photon, such as its polarization, phase or energy/time. The photon may even carry more than one bit of information, for example, by using properties such as angular momentum.

Quantum key distribution (QKD) is a technique which results in the sharing of cryptographic keys between two parties: a transmitter often referred to as "Alice"; and a receiver often referred to as "Bob". The attraction of this technique is that it provides a test of whether any part of the key can be known to an unauthorised eavesdropper, often referred to as "Eve". In many forms of quantum key distribution, Alice and Bob use two or more non-orthogonal bases in which to encode the bit values. The laws of quantum mechanics dictate that measurement of the photons by Eve without prior knowledge of the encoding basis of each causes an unavoidable change to the state of some of the photons. These changes to the states of the photons will cause errors in the bit values sent between Alice and Bob. By comparing a part of their common bit string, Alice and Bob can thus determine if Eve has gained information.

It is desirable for quantum channels to co-exist with classical channels in a quantum communication system. In QKD techniques, Alice and Bob communicate using classical signals in addition to quantum signals. Classical and quantum channels may be transmitted together along a single optical fibre using wavelength division multiplexing, whereby different wavelengths of light are used to transmit the different signals.

When quantum and classical channels are multiplexed together in this way, Raman scattering of photons is generated by the high power classical lasers used to transmit the classical signals. This inelastic scattering of photons leads to noise in the quantum wavelength band which cannot be filtered with wavelength filters. In order to minimize this noise, the power of the classical signals may be restricted, for example.

BRIEF DESCRIPTION OF THE FIGURES

Devices and methods in accordance with non-limiting embodiments will now be described with reference to the accompanying figures in which:

FIG. 10A is a schematic illustration of a Gigabit-capable passive optical network;

FIG. 10B is a schematic illustration of a variation of the network of FIG. 10(a).

DETAILED DESCRIPTION

Figure 1A:
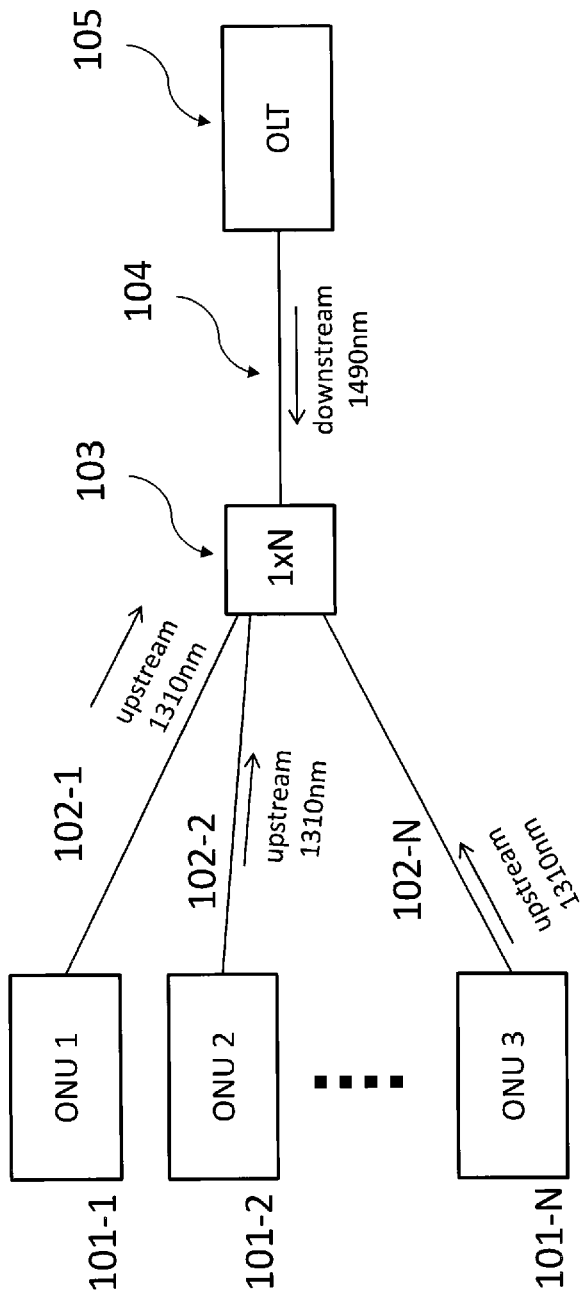
FIG. 1A shows a schematic illustration of an optical communication network.

According to one embodiment, there is provided a quantum communication system, comprising:
- a plurality of transmitter units, each transmitter unit comprising a source of quantum signals;
- a receiver unit, comprising:
  - a quantum receiver, comprising at least one detector configured to detect quantum signals; and
  - a first classical communication device; and
- a passive optical splitter, wherein the plurality of transmitter units are optically coupled to the receiver unit through the passive optical splitter, wherein the passive optical splitter is optically coupled to the quantum receiver through a first spatial channel and optically coupled to the first classical communication device through a second spatial channel, and wherein the passive optical splitter is configured to distribute an inputted optical signal irrespective of its wavelength.

In one embodiment, the passive optical splitter is configured such that the first spatial channel is optically coupled through the passive optical splitter to a plurality of spatial channels and the second spatial channel is optically coupled through the passive optical splitter to the same plurality of spatial channels.

In an embodiment, a first spatial channel of the plurality of spatial channels is optically coupled to a first transmitter unit of the plurality of transmitter units and a second spatial channel of the plurality of spatial channels is optically coupled to a second transmitter unit of the plurality of transmitter units.

In one embodiment, a signal inputted from a first spatial channel is outputted through a plurality of spatial channels and a signal inputted from a second spatial channel is outputted through the same plurality of spatial channels.

In one embodiment, the first classical communication device is a transmitter. In one embodiment, the first classical communication device is a transceiver.

In one embodiment, each transmitter unit comprises a second classical communication device. The first classical communication device may be a source of classical signals, and the second classical communication device may be a detector, configured to detect classical signals. The first classical communication device and the second classical communication device may be transceivers.

In one embodiment, the quantum transmitter components and classical communication components are integrated onto a photonic chip for each transmitter unit, and the quantum receiver components and classical communication components are integrated onto a photonic chip for the receiver unit.

In one embodiment, the quantum transmitter components and classical communication components for each transmitter unit are optically coupled using free-space micro-optics, and the quantum receiver components and classical communication components for the receiver unit are coupled using free-space micro-optics. The light is coupled into an optical fibre only at the output of the transmitter unit and receiver unit.

In one embodiment, the plurality of transmitter units are optically coupled to the receiver unit through a splitting unit. The splitting unit comprises the passive optical splitter. The splitting unit may also comprise further components such as a spatial mode de-multiplexer or a fibre fan-out. The system may comprise a plurality of splitting units.

In an embodiment, the passive optical splitter is wavelength independent over a certain wavelength range, for example the telecom C, O, or L band. By wavelength independent, it is meant that any wavelength dependence is sufficiently small such that it does not affect the functionality of the device. In one embodiment, the splitting ratio between the inputs and outputs of the passive optical splitter changes by less than 20% over the specified wavelength range. In one embodiment, the splitting ratio between inputs and outputs of the passive optical splitter changes by less than 10% over the specified wavelength range, In one embodiment, the splitting ratio between inputs and outputs of the passive optical splitter changes by less than 50% over the specified wavelength range.

The passive optical splitter does not reflect or transmit light depending on its wavelength. It is not wavelength selective. It does not select or split optical signals based on the wavelength of the optical signals.

The passive optical splitter may be configured not to cause significant polarisation dependent loss to a signal, i.e. any polarisation dependent loss is sufficiently small such that it does not affect the functionality of the quantum and classical receivers.

In one embodiment, the source of quantum signals is a pulsed laser and an optical attenuator. The quantum transmitters may be configured to emit pulses of photons, wherein the average number of photons in a pulse is less than 1. Information may be encoded onto the light pulses by changing a quantum parameter of the photons such as polarisation or phase. The quantum transmitter may also comprise an intensity modulator configured to realise a decoy-state QKD protocol.

The at least one detector may be a single photon detector. The single photon detector may be either gated or free-running. The single photon detector can be based on semiconductor InGaAs avalanche photodiodes, for example.

In one embodiment, the receiver unit comprises a timing control module, configured to allow only a single transmitter unit to emit a quantum signal for each arrival time at the quantum receiver, the timing control module also allowing the transmitter unit which sent the quantum signal to be identified.

In one embodiment, the first classical communication device is configured to receive a signal from the timing control module and send the signal to the second classical communication device through the second spatial channel.

In another embodiment, synchronisation is realised by generating a system clock at the quantum transmitter from data sent over the classical channel.

In one embodiment, the passive optical splitter comprises at least two waveguides which are evanescently coupled. In an embodiment, the passive optical splitter is an M×N passive optical splitter, where M≥2 and N≥2. In an embodiment, the passive optical splitter comprises a 2×2 passive optical splitter and a plurality of 1×2 passive optical splitters connected together in a cascading fashion.

In one embodiment, the passive optical splitter comprises at least one multi-mode interference section. In an embodiment, the passive optical splitter is a multi-mode interference splitter. In an embodiment, the multi-mode interference splitter is an M×N multi-mode interference splitter, where M≥2 and N≥2.

In one embodiment, the first spatial channel comprises a first optical fibre and the second spatial channel comprises a second optical fibre.

In one embodiment, the first spatial channel and the second spatial channel comprise first and second spatial modes in an optical waveguide configured to transmit a plurality of spatial modes. In one embodiment, the system comprises a spatial mode de-multiplexer, wherein the quantum receiver and first classical communication device are optically coupled to the passive optical splitter through the spatial mode de-multiplexer.

The spatial mode de-multiplexer may comprise a fibre bundle comprising a plurality of optical fibres, wherein the outer diameter of the cladding of each fibre in the fibre bundle is tapered at one end, and wherein a first optical fibre in the fibre bundle is optically coupled at the first end to a first mode in the multi-mode optical fibre and at the other end to a first waveguide, and wherein a second optical fibre in the fibre bundle is optically coupled at the first end to a second mode in the multi-mode optical fibre and at the other end to a second waveguide. The first waveguide and second waveguide may be optically coupled to a passive optical splitter.

The spatial mode de-multiplexer may comprise a photonic chip, comprising a plurality of waveguides, wherein the spacing between the waveguides on the photonic chip at a first end is such that the light from the different waveguides on the chip is launched into a single multi-mode optical fibre, and wherein a first waveguide on the photonic chip is optically coupled at the first end to a first mode in the multi-mode optical fibre and at the other end to a first waveguide, and wherein a second waveguide on the photonic chip is optically coupled at the first end to a second mode in the multi-mode optical fibre and at the other end to a second waveguide. The first waveguide and second waveguide may be optically coupled to a passive optical splitter.

The multi-mode fibre may be configured to transmit less than 50 spatial modes. The multi-mode fibre may be configured to transmit less than 10 spatial modes. The multi-mode fibre may be configured to transmit 2 spatial modes. The multi-mode fibre may be in excess of 1 km. The multi-mode fibre may be in excess of 10 km. The multi-mode fibre may be in excess of 20 km.

In one embodiment, the first spatial channel and the second spatial channel comprise first and second cores in a multi-core optical fibre. In one embodiment, the multi-core optical fibre comprises two cores. In one embodiment, the multi-core optical fibre comprises 6 or more cores. The multi-core optical fibre may comprise a plurality of optical cores surrounded by a shared cladding.

In one embodiment, the system further comprises a fibre fan-out, wherein the quantum receiver and first classical communication device are optically coupled to the passive optical splitter through the fibre fan-out.

The fibre fan-out may comprise a fibre bundle comprising a plurality of optical fibres, wherein the outer diameter of the cladding at a first end of each optical fibre in the fibre bundle is less than or equal to the smallest distance between the cores in the multi-core optical fibre, and wherein a first optical fibre in the fibre bundle is optically coupled at the first end to the first core in the multi-core optical fibre and at the other end to a first waveguide, and wherein a second optical fibre in the fibre bundle is optically coupled at the first end to the second core in the multi-core optical fibre and at the other end to a second waveguide.

Alternatively, fibre fan-out may comprise a photonic chip, comprising a plurality of waveguides, wherein the spacing between the waveguides on the photonic chip at a first end is substantially equal to the distance between the cores in the multi-core optical fibre, and wherein a first waveguide on the photonic chip is optically coupled at the first end to the first core in the multi-core optical fibre and at the other end to a first waveguide, and wherein a second waveguide on the photonic chip is optically coupled at the first end to the second core in the multi-core optical fibre and at the other end to a second waveguide. The first waveguide and second waveguide may be optically coupled to a passive optical splitter.

In one embodiment, the classical communication system between the first classical communication device and the second classical communication device is a gigabit-capable passive optical network.

In one embodiment, the quantum receiver comprises a decoder and the quantum transmitter comprises an encoder, configured to generate an encryption key between the quantum receiver and the quantum transmitter.

In one embodiment, each transmitter unit comprises a module configured to encrypt classical data using the generated encryption key, and wherein the second communication device is configured to send the encrypted classical data to the first communication device through the second spatial channel, and wherein the receiver unit comprises a module configured to decrypt the encrypted data received by the first classical communication device using the generated encryption key.

In one embodiment, the receiver unit comprises a module configured to encrypt classical data using the generated encryption key, and wherein the first communication device is configured to send the encrypted classical data to the second communication device through the second spatial channel, and wherein the transmitter unit comprises a module configured to decrypt the encrypted data received by the second classical communication device using the generated encryption key.

In one embodiment, the quantum communication system uses bi-directional classical communication for at least one of synchronisation, feedback control, error correction and privacy amplification.

In one embodiment, the at least one detector is a gated detector and the timing control module is configured to synchronise the gating of the detector with the arrival time of signals from the transmitter units.

In one embodiment, the receiver unit comprises a feedback control unit configured to generate a feedback signal for each transmitter unit, and wherein the first classical communication device is configured to transmit the feedback signal to the transmitter unit, the transmitter unit comprising a control element configured to be controlled by the feedback signal.

In one embodiment, the feedback control signal is the quantum bit error ratio. In one embodiment, the feedback control signal comprises detection results of reference pulses sent from the quantum transmitter to the quantum receiver. In one embodiment, the control element is a tunable phase delay in the asymmetrical Mach-Zehnder interferometer, or the phase modulator.

In one embodiment, the feedback control signal is the count rate of interfering photons. In one embodiment, the control element is a polarisation controller. In one embodiment, the control element is the delay, or time control, or trigger of the photon source.

According to one embodiment, there is provided a quantum communication method for communicating over a system comprising a receiver unit, the receiver unit comprising a source of classical signals and the receiver unit further comprising a quantum receiver, the quantum receiver comprising at least one detector configured to detect quantum signals; the system further comprising a plurality of transmitter units, each transmitter unit comprising a detector configured to detect classical signals and each transmitter unit further comprising a source of quantum signals; and the system further comprising a passive optical splitter, wherein the plurality of transmitter units are optically coupled to the receiver unit through the passive optical splitter; the method comprising the steps of:

sending quantum signals from the plurality of transmitter units to the passive optical splitter;

distributing the quantum signals into a first spatial channel and a second spatial channel, irrespective of the wavelength of the quantum signals;

receiving the quantum signals from the first spatial channel at the quantum receiver;

sending a classical signal from the receiver unit to the passive optical splitter through a second spatial channel;

distributing the classical signal to the plurality of transmitter units, irrespective of the wavelength of the classical signal;

wherein the passive optical splitter is optically coupled to the quantum receiver through a first spatial channel and optically coupled to the first classical communication device through a second spatial channel.

FIG. 1A shows a schematic illustration of an optical communication network. The network comprises N optical network units (ONUs) 101-1 to 101-N, which are connected to optical line terminal (OLT) 105 via passive optical splitter 103. Feeder fibre 104 connects OLT 105 to passive optical splitter 103, and distribution fibres 102-1 to 102-N connect the ONUs 101-1 to 101-N to passive optical splitter 103. The terms "feeder fibre" and "distribution fibre" refer to the location of the fibres in the network. Feeder fibres are also sometimes referred to as trunk fibres.

In the downstream direction (from the OLT to the ONUs), a data signal at 1490 nm is broadcast to all users. In the upstream direction (from the ONUs to the OLT), signals are transmitted at 1310 nm.

The feeder fibre 104 is shared by the upstream signals with time-division multiplexing. The OLT 105 assigns timeslots to each ONU based on the bandwidth requirement of the ONU. During its assigned time slot, the ONU is allowed to transmit its data. For example, ONU 1 transmits its upstream signal during a first time slot, ONU 2 transmits its upstream signal during the subsequent time slot, ONU 3 transmits its upstream signal during the subsequent time slot, and so on.

The upstream signals and downstream signals are also transmitted along the same fibres, but at different wavelengths. In other words, the upstream signals and downstream signals are transmitted along the same fibres using wavelength division multiplexing.

The individual users (ONUs) in the network can be addressed with a unique ID, and each ONU processes only the downstream data addressed to him. In principle, any ONU can pick up any downstream data, which allows for easy eavesdropping of the downstream data. The downstream data may therefore be encrypted.

Figure 1B:
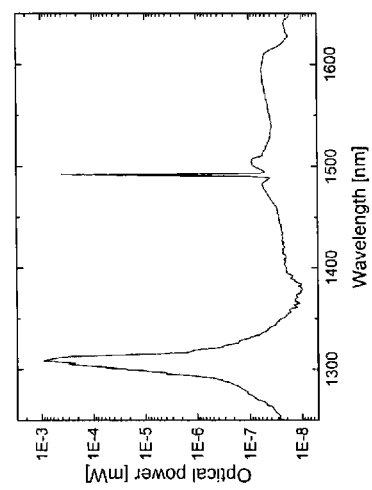
FIG. 1B shows a Raman scattering spectrum of a classical signal transmitted at 1490 nm and an upstream signal at 1310 nm.

FIG. 1B shows a spectrum measured by inserting a 50:50 optical beam splitter in front of the OLT 105, and connecting an optical spectrum analyser to the second output of the 50:50 optical beam splitter. Wavelength is shown on the horizontal axis in nm, with optical power in mW on the vertical axis. With this method of measurement, all of the light travelling in the upstream direction is measured. The spectrum shows a strong peak at 1310 nm originating from the upstream signals of the ONUs. The peak at 1490 nm is due to Rayleigh scattering of the downstream signal. The broad background comes from Raman scattering, mainly from backscattering of the downstream signal in the feeder fibre. Raman noise arises from inelastic scattering of photons into the quantum wavelength band. Scattering occurs both in forward direction (direction of travel of the light signal) and backward direction.

In a quantum optical network, it is desirable for quantum signals to co-exist with classical signals. In upstream quantum access networks, multiple quantum transmitters are connected to a single quantum receiver via a 1×N passive optical splitter, as in FIG. 1. Quantum signals are sent in the upstream direction, from each quantum transmitter to the quantum receiver. A classical signal may be sent in the downstream direction, from the OLT 105 (which may also comprise a classical transmitter) to the ONUs 101-1 to 101-N (which may also comprise classical receivers).

The classical downstream data signal can cause Raman noise in the feeder fibre which is at the same wavelength as the quantum signal. The upstream quantum signals have to pass through the passive optical splitter to get to the receiver. The passive optical splitter has high signal loss. A 1×8 passive optical splitter (i.e. a beam splitter having one port connected to the receiver, and 8 ports connected to the transmitters) reduces the power of a signal by at least a factor 8 (corresponding to 9 dB). A 1×16 passive optical splitter (i.e. a beam splitter having one port connected to the receiver and 16 ports connected to the transmitters) reduces the power of a signal by at least a factor of 16, and so on.

The upstream quantum signal in the feeder fibre has passed through the beam splitter 103. The downstream signal in the feeder fibre has not yet passed through beam splitter 103. However, it is launched with high enough power to compensate for the eventual loss in the beam splitter. There is therefore an imbalance in the feeder fibre, with the quantum signal having passed through the beam splitter but the downstream Raman noise from the downstream signal not having passed through the beam splitter. Downstream Raman noise in the quantum wavelength band cannot be filtered with wavelength filters.

Figure 2:
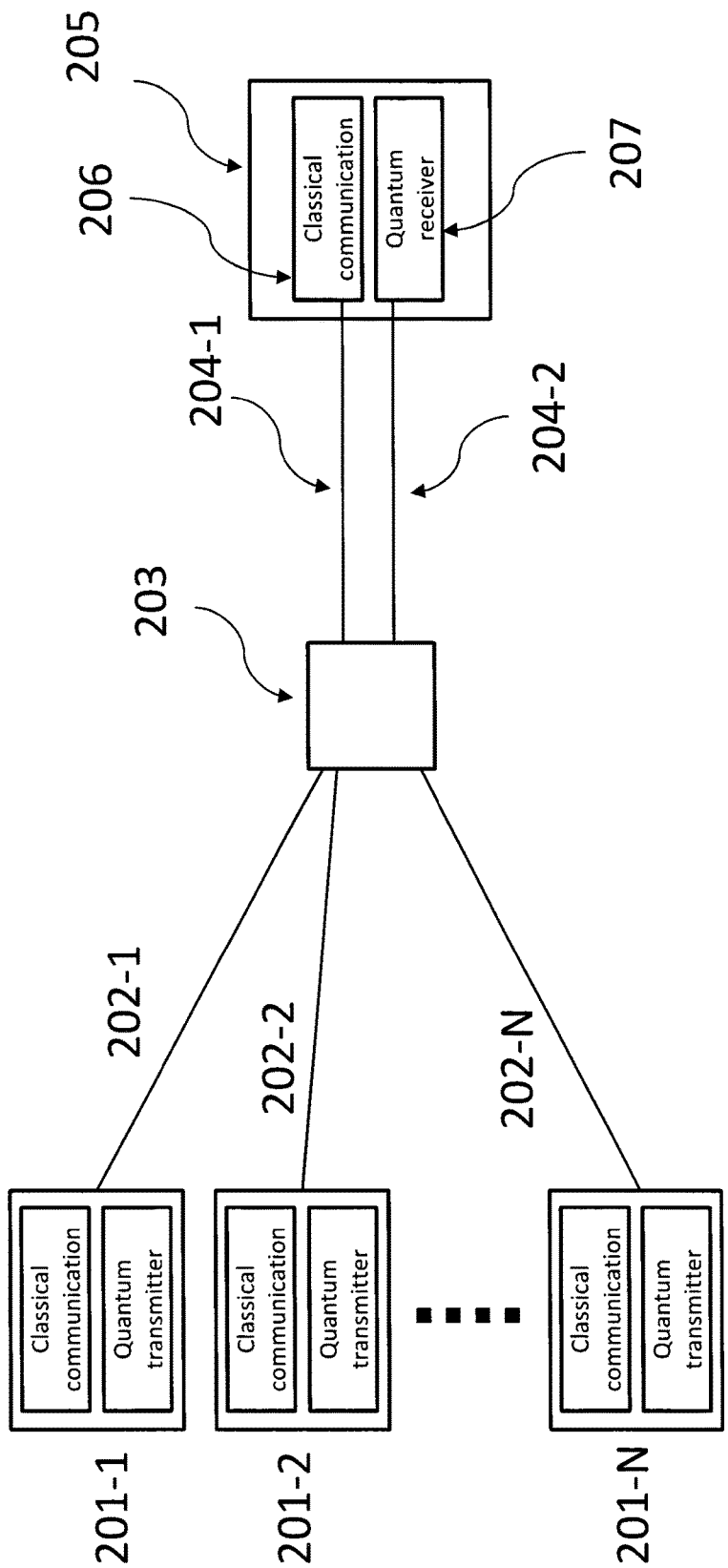
FIG. 2 shows a schematic illustration of a quantum communication system in accordance with an embodiment.

FIG. 2 shows a schematic illustration of a quantum communication system in accordance with an embodiment. The system is an optical network transmitting both quantum signals and classical data signals. N combined quantum and classical optical network units (ONUs) 201-1 to 201-N are connected via wavelength independent splitting unit 203 to combined quantum and classical optical line terminal (OLT) 205.

Splitting unit 203 comprises a passive optical splitter. It may also comprise further optical components. The plurality of ONUs 201-1 to 201-N are optically coupled to the OLT 205 through the passive optical splitter. In one embodiment, the passive optical splitter has a plurality of spatial outputs and two spatial inputs OLT 205 comprises a classical communication device 206 and a quantum receiver 207. The passive optical splitter is optically coupled to the quantum receiver 207 through a first spatial channel 204-2 and optically coupled to the classical communication device 206 through a second spatial channel 204-1. The passive optical splitter is configured to distribute an inputted optical signal irrespective of its wavelength.

A downstream classical signal travelling between the classical communication device 206 and the passive optical splitter travels in a separate spatial channel to the quantum signal that is received at the quantum receiver 207. The separation of the quantum and downstream classical signal into different spatial channels means that photons generated from Raman backscattering of the downstream classical signal do not reach the quantum receiver.

The passive optical signal distributes the signals irrespective of wavelength. The passive optical splitter is wavelength independent over a certain wavelength range, for example the telecom C, O, or L band. It does not reflect or transmit light depending on its wavelength. By wavelength independent, it is meant that any wavelength dependence is sufficiently small such that it does not affect the functionality of the device. In one embodiment, the splitting ratio between the inputs and outputs of the passive optical splitter changes by less than 20% over the specified wavelength range. In one embodiment, the splitting ratio between inputs and outputs of the passive optical splitter changes by less than 10% over the specified wavelength range, In one embodiment, the splitting ratio between inputs and outputs of the passive optical splitter changes by less than 50% over the specified wavelength range. It is not wavelength selective. It does not select or split optical signals based on the wavelength of the optical signals. A component which is not wavelength selective is compatible with a large range of systems, and allows development of cost-effective networks.

In one embodiment, the splitting unit 203 has a plurality of spatial outputs and two spatial inputs. Splitting unit 203 is optically coupled to each ONU 201-1 to 201-N through separate spatial channels 202-1 to 202-N, which are connected to the outputs. It is optically coupled to the OLT 205 through two spatial channels 204-1 and 204-2, which are connected to the inputs. Spatial channel 204-1 optically couples to classical communication device 206 and spatial channel 204-2 optically couples to quantum receiver 207.

The downstream classical signal travelling between the classical communication device 206 and the splitting unit 203 travels in a separate spatial channel to the quantum signal that is received at the quantum receiver 207. Splitting unit 203 distributes signals between the outputs and inputs irrespective of the wavelength of the signals.

The quantum communication system comprises a plurality of ONUs 201-1 to 201-N. Each ONU comprises a quantum transmitter and may also comprise a classical communication device. In one embodiment, the classical communication device is a classical receiver. The quantum transmitter comprises a source of quantum signals, for example, a pulsed laser and an optical attenuator. The quantum transmitters may be configured to emit pulses of photons, wherein the average number of photons in a pulse is less than 1. Information may be encoded onto the light pulses by changing a quantum parameter of the photons such as polarisation or phase.

OLT 205 comprises a classical communication device 206 and a quantum receiver 207. In one embodiment, classical communication device 206 is a source of classical signals. The quantum receiver comprises one or more detectors, for example single photon detectors. The single photon detectors can be either gated or free-running. The single photon detectors can be based on semiconductor InGaAs avalanche photodiodes for example.

Classical communication device 206 is optically coupled to splitting unit 203 through spatial channel 204-1 and quantum receiver 207 is optically coupled to splitting unit 203 through spatial channel 204-2. Classical data signals travel between splitting unit 203 and classical communication device 206 via spatial channel 204-1. Quantum signals travel between the splitting unit 203 and quantum receiver 207 via spatial channel 204-2.

The classical signal can be composed of several signals transmitted at different wavelengths. This could be, for example, a data signal at 1490 nm and a master clock signal at 1610 nm.

In one embodiment, the quantum communication system uses bi-directional classical communication. Bi-directional classical communication can be used for synchronisation, feedback, error correction and privacy amplification in a QKD system for example. In this embodiment, classical communication device 206 is a bi-directional communication device. Bi-directional communication may be performed on the waveguide 204-1 using wavelength division multiplexing (WDM). A bi-directional classical communication device may be a transceiver, i.e. a receiver and transmitter in a compact module. The transceiver is optically coupled to waveguide 204-1. It may transmit classical signals at a first wavelength into the waveguide 204-1 and receive signals travelling along waveguide 204-1 at a second wavelength. A transceiver is distinct from a system having several separated receivers/transmitter, where each receiver/transmitter is optically coupled to a separate waveguide and could be at different physical locations.

In one embodiment, ONUs 201-1 to 201-N comprise a source of classical data signals and the classical data is received at classical communication device 206 over spatial channel 204-1. In another embodiment, spatial channel 204-2 is connected to a wavelength filter at the OLT and classical data signals are received from spatial channel 204-2. The wavelength filter separates out the classical data signal before the quantum receiver 207, and directs the classical data signal to a second classical communication device. A quantum receiver and a second classical communication device are connected to fibre 204-2 via a WDM coupler in this embodiment.

Optical signals inserted into the inputs of the splitting unit 203 (which are connected to spatial channels 204-1 and 204-2) are distributed with a fixed ratio into outputs of the splitting unit 203 (which are connected to spatial channels 202-1 to 202-N). In one embodiment, the signal inserted into each input is split N-fold, with a fraction 1/N of the optical signal inserted into each of the inputs distributed into each output. Thus a signal inputted from the first spatial channel 204-1 is outputted through the plurality of spatial channels 202-1 to 202-N and a signal inputted from the second spatial channel 204-2 is outputted through the same plurality of spatial channels 202-1 to 202-N.

Optical signals inserted into any of the outputs (which are connected to spatial channels 202-1 to 202-N) will be distributed with a fixed ratio into the inputs (which are connected to spatial channels 204-1 and 204-2). In one embodiment, the splitting unit 203 has two spatial inputs and a fraction 1/N of the optical signal inserted into each of the outputs will be distributed into the first spatial input and into the second spatial input. Thus the signals inputted from each spatial channel 202-1 to 202-N are outputted through both spatial channels 204-1 and 204-2.

Although the terms "input" and "output" are used in the above description, optical signals can travel in either direction in the spatial channels 204-1 and 204-2 and 202-1 to 202-N and through the splitting unit 203.

In an embodiment, the inputs are separate ports connected to single-mode fibres. In another embodiment, the inputs are different modes output through a port connected to a few-mode fibre or a multi-mode fibre. In another embodiment, the inputs are ports connected to different cores in a multi-core fibre. Where the inputs are separate ports connected to single-mode fibres or to separate cores in a multi-core fibre, the signals are transmitted on separate waveguides. Where the inputs are different modes output through a single port connected to a few-mode fibre, they are transmitted in the same waveguide.

In an embodiment, the spatial channels 204-1 and 204-2 comprise separate optical fibres. In an embodiment, the spatial channels 204-1 and 204-2 comprise different spatial modes in a few-mode or multi-mode fibre.

The quantum communication system may be a quantum key distribution network for example.

Figure 3A:
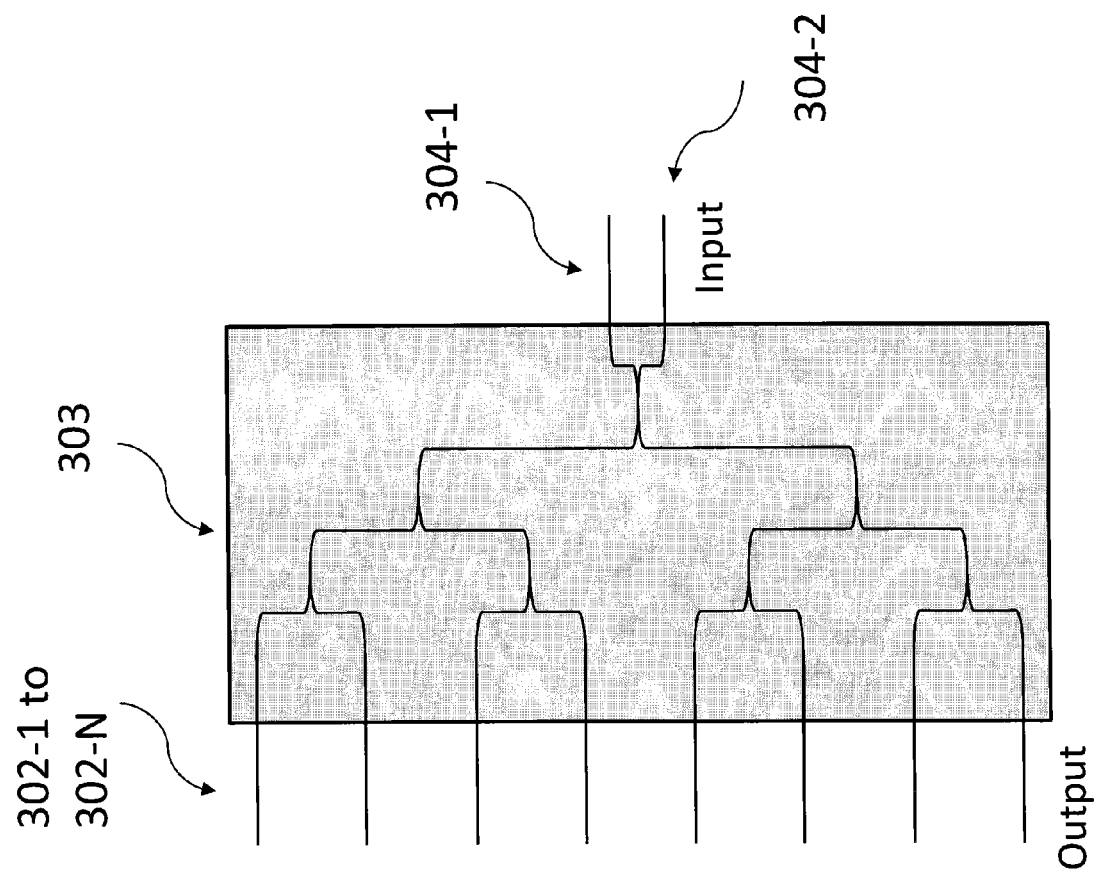
FIG. 3A shows a schematic illustration of a passive optical splitter.

FIG. 3A shows a schematic illustration of a 2×N passive optical splitter 303 which comprises at least two waveguides which are evanescently coupled. In an embodiment, splitting unit 203 comprises a 2×N passive optical splitter 303. A passive optical splitter is sometimes referred to as an optical power splitter.

A first single mode optical fibre 304-1 is connected to a first input of a 2×2 passive optical splitter inside 2×N passive optical splitter 303. A second single mode optical fibre 304-2 is connected to a second input of the 2×2 passive optical splitter inside 2×N passive optical splitter 303. Each output of the 2×2 passive optical splitter is connected to the input of a 1×2 passive optical splitter. Each output of each of the 1×2 passive optical splitters is connected a further 1×2 passive optical splitter, and so on, such that a 2×N splitter is formed. N single mode fibres 302-1 to 302-N are connected to the output of 2×N passive optical splitter 303.

Although the terms "input" and "output" are used, optical signals can travel in either direction in the optical fibres 302-1 to 302-N and 304-1 and 304-2, and in the passive optical splitter 303.

In an embodiment, the passive optical splitter 303 has 2 inputs and 8 outputs, i.e. it is a 2×8 passive optical splitter. The passive optical splitter 303 comprises a passive optical splitter having 2 inputs and 2 outputs. The 2 inputs are the first input and second input of the passive optical splitter 303, and are connected to optical fibres 304-1 and 304-2. Each of the outputs is connected to the input of a passive optical splitter having one input and 2 outputs. Each of these outputs is connected to the input of a passive optical splitter having one input and two outputs. The passive optical splitter thus comprises a 2×2 passive optical splitter and six 1×2 passive optical splitters, connected in a cascading fashion.

Optical signals inserted into the first input from optical fibre 304-1 are distributed with a fixed ratio into the 8 outputs. The signal is split 8-fold, with a fraction ⅛ of the optical signal inserted into the first input distributed into each output. Optical signals inserted into the second input from optical fibre 304-2 are also distributed with a fixed ratio into the 8 outputs. The signal is also split 8-fold, with a fraction ⅛ of the optical signal inserted into the second input distributed into each output. A signal which comprises a fraction ⅛ of the signal inserted into the first input and ⅛ of the signal inserted into the second input exits from each output.

Optical signals inserted into a first output are distributed with a fixed ratio into each of the two inputs. The signal is split 8-fold, with a fraction ⅛ of the optical signal inserted into the first output distributed into each of the two inputs. A signal which comprises a fraction ⅛ of the signal inserted into each of the 8 inputs exits from each of the two outputs.

A 1×2 passive optical splitter is equivalent to a 2×2 passive optical splitter having one input not connected. A signal inputted into one of the two output ports of a 1×2 passive optical splitter is not transmitted fully to the single input port. Only a fraction ½ is transmitted into the input port.

A 2×N passive optical splitter such as described can be used as a wavelength independent splitter.

The passive optical splitter 303 may be a M×N passive optical splitter, where M≥2 and N≥2.

In one embodiment, the passive optical splitter 303 uses evanescent coupling to couple light from one waveguide into one or several other waveguides. In one embodiment, the passive optical splitter 303 comprises two or more optical fibres, wherein the cladding thickness of the optical fibres is reduced, and two or more fibres are arranged in close contact. In the contact region, light is evanescently coupled from one fibre into the other fibres in an oscillatory manner, i.e. the length of the coupling region determines how much light is coupled from one fibre into the other fibres. In other words, the length of the coupling region determines the splitting ratio. The length of the coupling region can be such that, for example, 50% of the light is coupled from one waveguide to the other. In one embodiment, the passive optical splitter 303 is implemented on a photonic chip. Several waveguides on the photonic chip are arranged in close contact to each other, such that in the contact region, light is evanescently coupled from one waveguide into the other waveguides.

In an alternative embodiment, the passive optical splitter is an optical cross coupler, in which two waveguides are crossed in order to couple light from one waveguide to another.

In an embodiment, the passive optical splitter comprises a plurality of 1×2 passive optical splitters and/or 2×2 passive optical splitters connected together in a cascading fashion.

Alternatively, the passive optical splitter may comprise a single passive optical splitter having M input waveguides and N output waveguides arranged in close contact, such that light is coupled from the M waveguides into the N waveguides. In an embodiment, where M≤N, the splitter has a 1/N splitting ratio. This is because an M×N splitter is in principle a N×N splitter with less inputs connected than N.

Figure 3B:
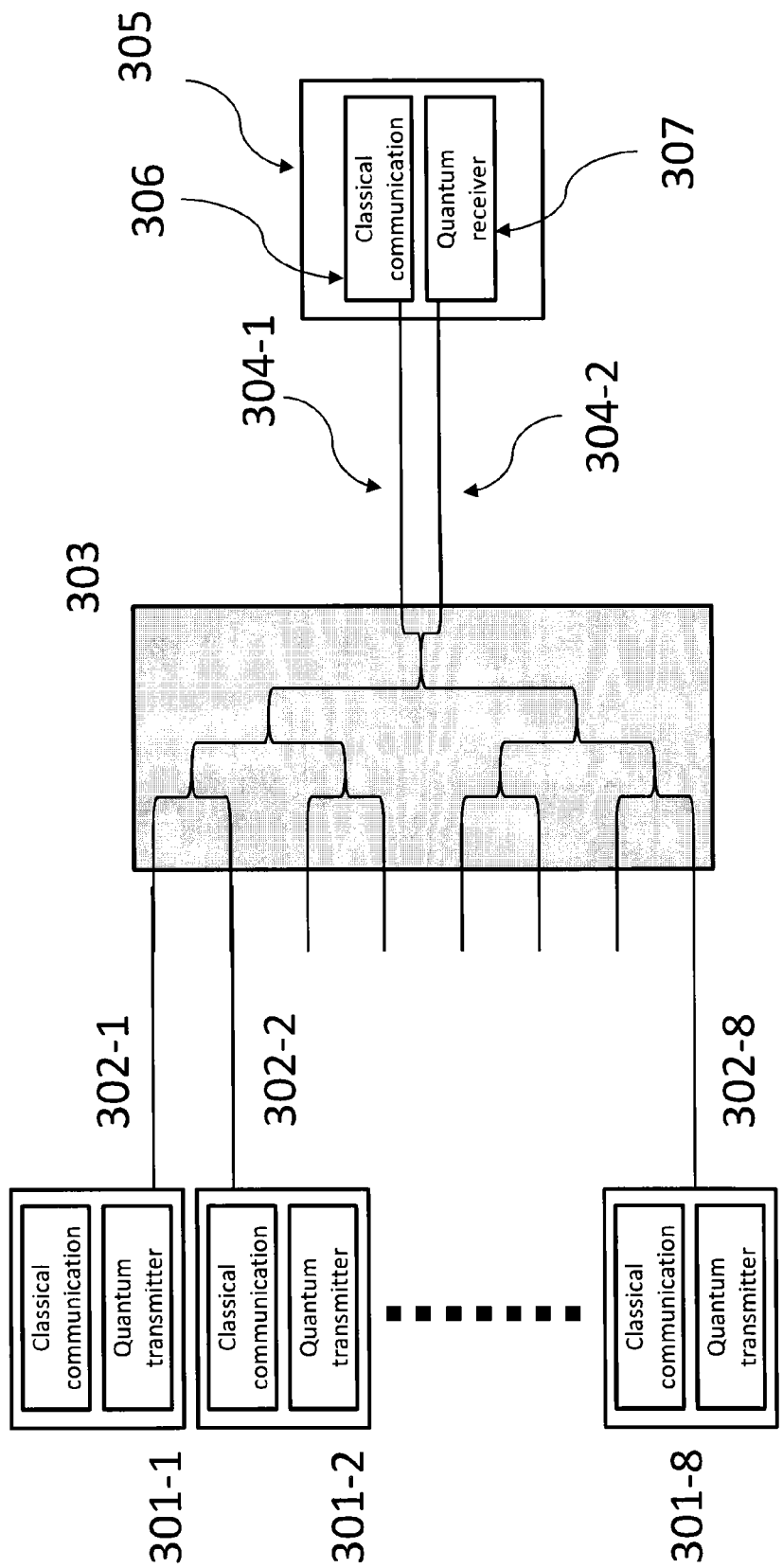
FIG. 3B shows a quantum communication system in accordance with an embodiment, comprising a passive optical splitter.

FIG. 3B shows a quantum communication system in accordance with an embodiment. The system comprises eight ONUs 301-1 to 301-8. Each ONU comprises a quantum transmitter and may comprise a classical communication device. Each ONU 301-1 to 301-8 is optically coupled to an output port of a 2×8 passive optical splitter 303 through an optical fibre 302-1 to 302-8. Although a system with 8 ONUs and a 2×8 passive optical splitter is shown, the system may have any number of ONUs, and the passive optical splitter may be a M×N passive optical splitter, where M≥2 and N≥2.

The 2×8 passive optical splitter 303 is optically coupled to OLT 305. OLT 305 comprises a classical communication device 306 and a quantum receiver 307. Classical communication device 306 is optically coupled to an input port of 2×8 passive optical splitter through an optical fibre 304-1 and quantum receiver 307 is optically coupled to 2×8 passive optical splitter 303 through optical fibre 304-2.

Figure 3C:
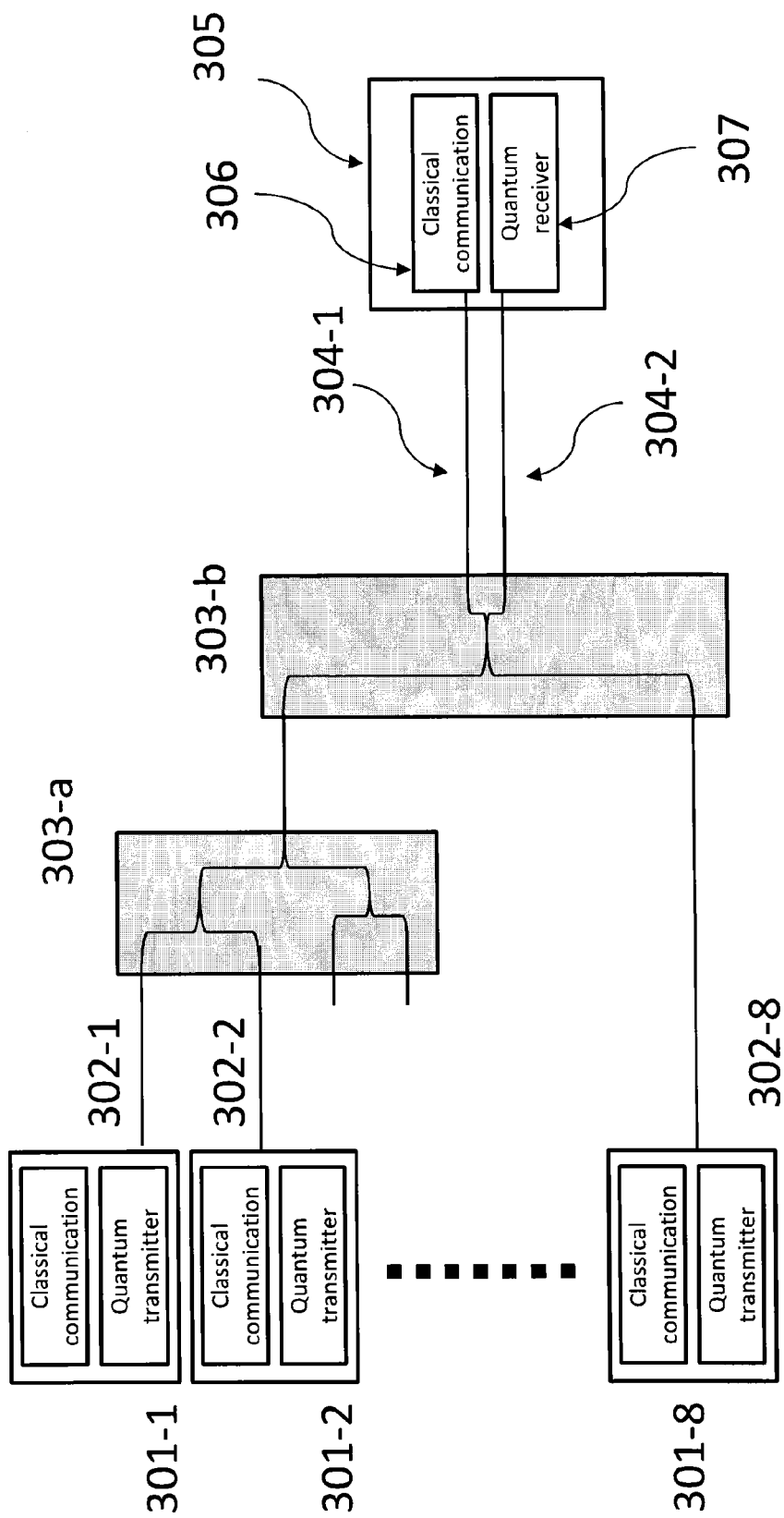
FIG. 3C shows a schematic illustration of a quantum communication system in accordance with an embodiment, comprising several splitting units, each comprising a passive optical splitter.

FIG. 3C shows a schematic illustration of a quantum communication system in accordance with an embodiment, in which the splitting is achieved in several steps.

Fibre 304-1 is connected at one end to the classical communication device 306 in the OLT 305 and at the other end to a first input of a 2×2 passive optical splitter 303-*b*. Fibre 304-2 is connected at one end to the quantum receiver 307 in the OLT 305 and at the other end to the second input of the 2×2 passive optical splitter 303-*b*. Passive optical splitter 303-*b* is a first splitting unit. Fibre 302-8 is connected at one end to a first output of 2×2 passive optical splitter 303-*b* and at the other end to ONU 301-8. The second output of passive optical splitter 303-*b* is connected via an optical fibre to the input of a first 1×2 passive optical splitter, which is part of a second splitting unit 303-*a*.

Second splitting unit 303-*a* is a 1×4 passive optical splitter, comprising three 1×2 passive optical splitters. Each output of the first 1×2 passive optical splitter is connected to the inputs of the two further 1×2 passive optical splitters. The outputs of the 1×4 passive optical splitter 303-*a* are connected to the ONUs 301-1 to 301-4.

Various combinations in which further splitting units are included are also possible. The ONUs could be connected directly to these further splitting units, or there could be yet more fibre links and more splitting units.

The signal received at each ONU can be a larger or smaller fraction of the original signal, depending on the number and configuration of passive optical splitters between the particular ONU and the OLT. In the example shown, the signal received at ONU 301-8 is ½ of the original signal from the OLT, the signal received at ONU 301-1 and ONU 302-2 is ½×¼=⅛ of the original signal from the ONU. In such a configuration, for ONU 301-1 to 301-4, after the first splitting unit 303-*b*, the downstream classical signal and quantum signal will be on the same fibre and the quantum signal will have been attenuated by the second splitting unit 303-a.

Figure 3D:
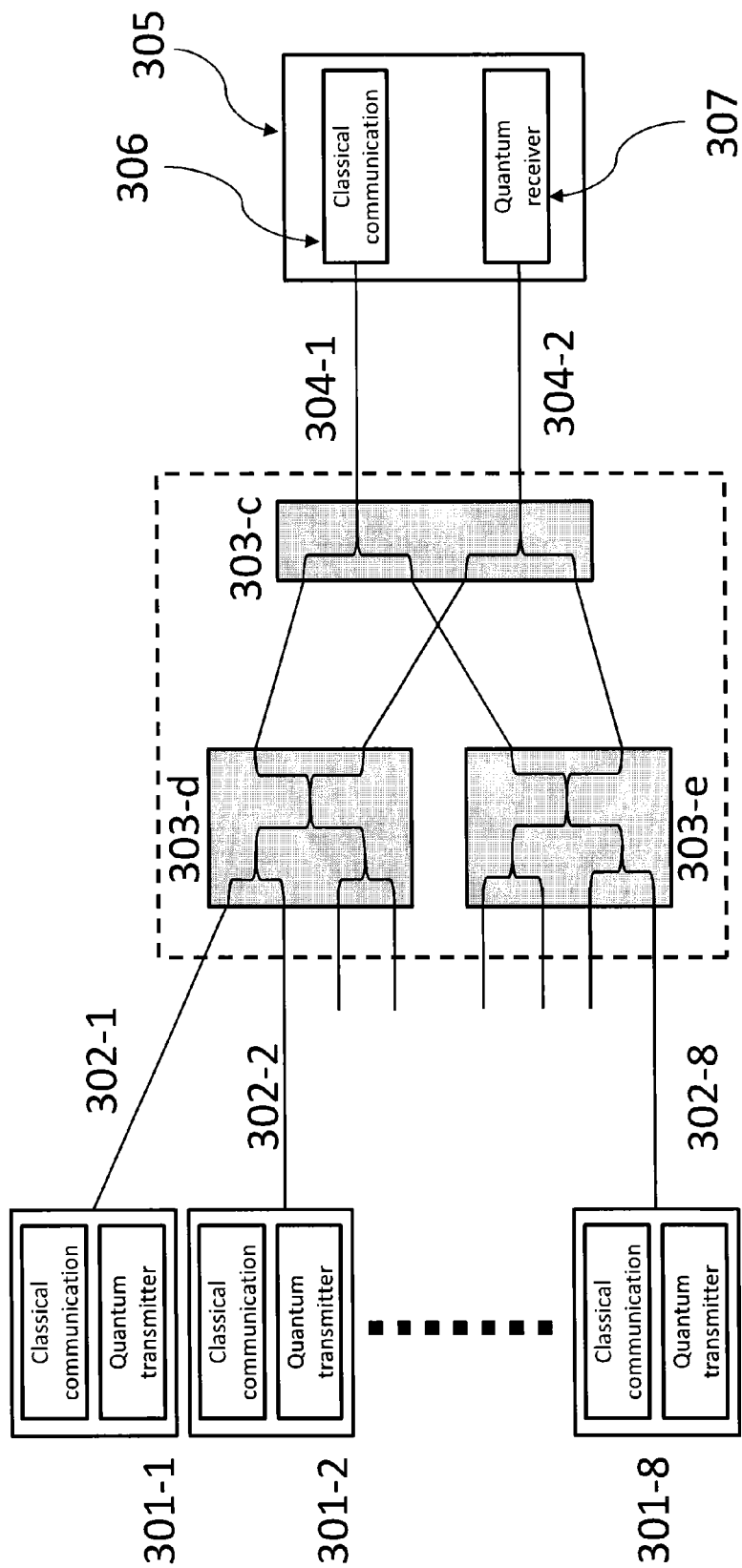
FIG. 3D shows a schematic illustration of a quantum communication system in accordance with an embodiment, comprising a passive optical splitter.

FIG. 3D shows a schematic illustration of a quantum communication system in accordance with an embodiment. Fibre 304-1 is connected at one end to the classical communication device 306 in the OLT 305 and at the other end to a first 1×2 splitter, and fibre 304-2 is connected at one end to the quantum receiver 307 at the OLT 305 and at the other end to the second 1×2 splitter. In other words, two feeder fibres are each connected to a separate 1×2 splitter.

The first output of the first 1×2 splitter is connected to a first waveguide, which is connected to a first input of a 2×N splitter, in this case a 2×4 splitter, in a splitting unit 303-d. The second output of the first 1×2 splitter is connected to a second waveguide, which is connected to a first input of a 2×M splitter, in this case also a 2×4 splitter, in a splitting unit 303-e.

The first output of the second 1×2 splitter is connected to a third waveguide, which is connected to a second input of the 2×N splitter in the splitting unit 303-d. The second output of the second 1×2 splitter is connected to a fourth waveguide, which is connected to the second input of the 2×M splitter in the splitting unit 303-e.

N ONUs are connected to the N outputs of the 2×N splitter in the splitting unit 303-d and M ONUs are connected to the M outputs of the 2×M splitter in the splitting unit 303-e. In this case, the signal received by each ONU is ⅛ of the original signal.

Figure 3E:
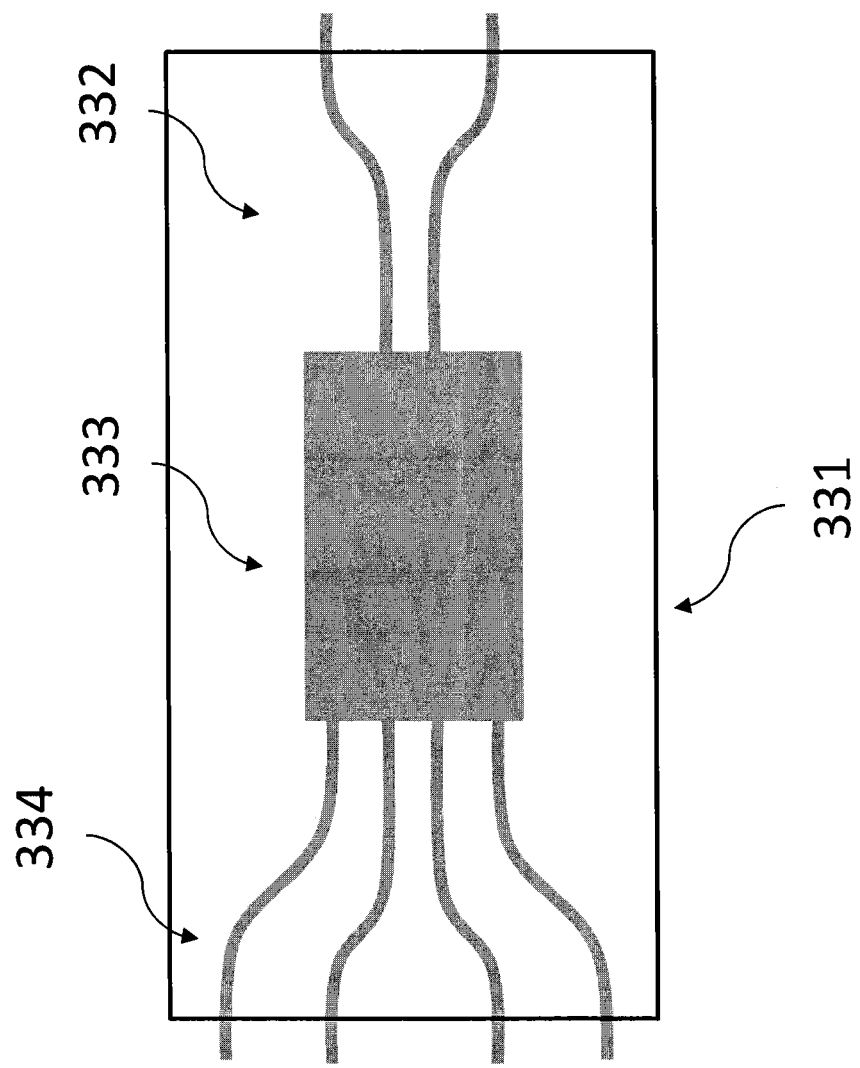
FIG. 3E is a schematic illustration of a multi-mode interference splitter.

FIG. 3E is a schematic illustration of a passive optical splitter 331 which is a multi-mode interference splitter. In an embodiment, splitting unit 203 comprises a multi-mode interference splitter. The multi-mode interference splitter may be an M×N multi-mode interference splitter, where M≥2 and N≥2. A multi-mode interference splitter is sometimes referred to as a multi-mode interference coupler.

The multi-mode interference splitter comprises M input single-mode waveguides 332, in this case 2, a multi-mode section 333 in which interference of multiple modes leads to generation of self-images and N output single-mode waveguides 334.

The splitter may be realised with waveguides on a chip fabricated with a suitable method, for example etching or direct writing with an intense laser beam. However, other realizations are possible. The multi-mode interference splitter 331 may be, for example, silicon, and comprise silicon-on-insulator waveguides.

A multi-mode interference splitter comprises single-mode inputs/outputs, and uses a different method to split the signals than the passive optical splitter shown in FIG. 3A, which uses evanescent coupling.

In a multi-mode interference splitter 331, light is inserted from a single-mode waveguide into a multi-mode waveguide region 333. Interference between several modes excited in the multi-mode waveguide region 333 leads to the generation of self-images of the input light distribution for certain propagation distances in the multi-mode waveguide. The output single-mode waveguides are positioned at a suitable distance to the input waveguides to couple light from the input with a certain intensity distribution into the output waveguides. For example, a 1×2 splitter is designed such that the length of multi-mode waveguide generates two self-images each with 50% of the input light power. At the position where these self-images are generated, the output single-mode waveguides are placed. Because it is an image of the input intensity distribution, the light is coupled efficiently into the output waveguides, 50% in each output.

In one embodiment, the multi-mode interference splitter is a 2×N splitter. In one embodiment, optical signals inserted into a first input waveguide 332-1 are distributed with a fixed ratio into the N outputs. The signal is split N-fold, with a fraction 1/N of the optical signal inserted into the first input waveguide 332-1 distributed into each output waveguide 334. Optical signals inserted into a second input waveguide 332-2 are also distributed with a fixed ratio into the N outputs.

Optical signals inserted into a first output waveguide 334-1 are distributed with a fixed ratio into each of the two inputs. The signal is split N-fold, with a fraction 1/N of the optical signal inserted into the first output 334-1 distributed into each of the two inputs.

Figure 4A:
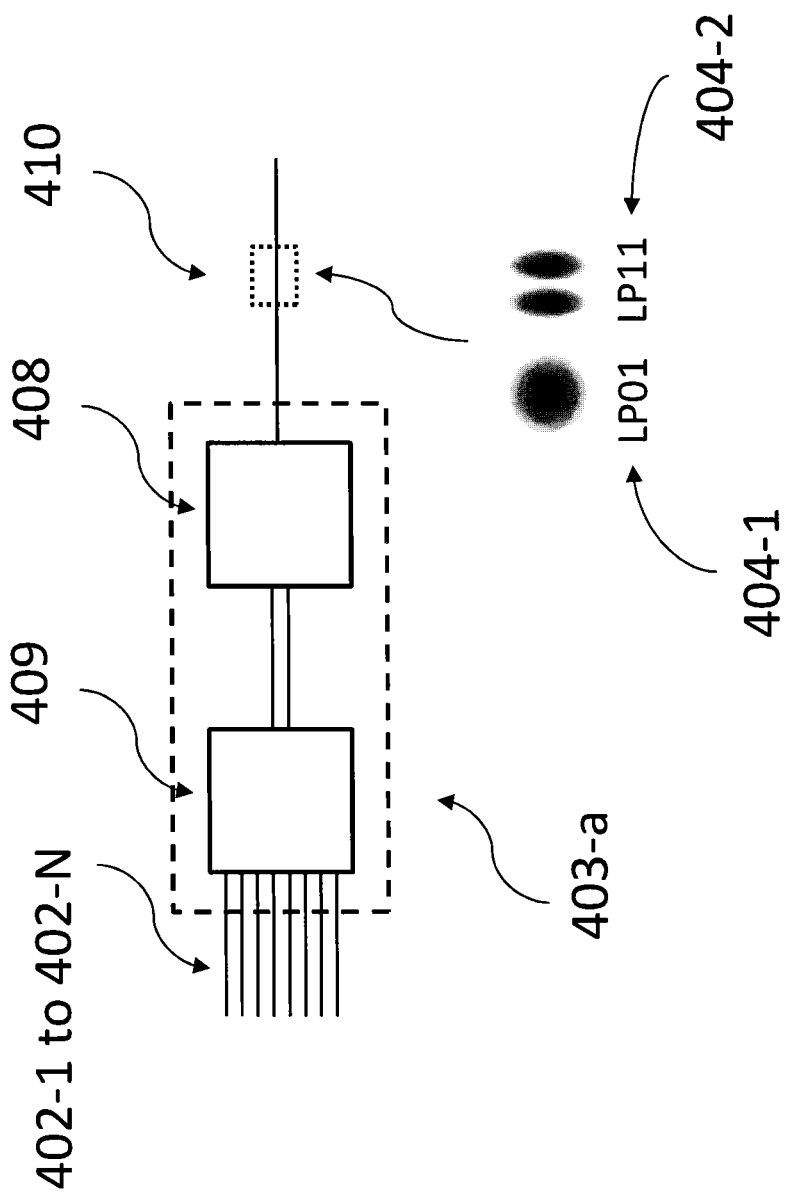
FIG. 4A is a schematic illustration of a splitting unit, connected to few-mode or multi-mode fibre.

FIG. 4A is a schematic illustration of a splitting unit 403-a, connected to few-mode or multi-mode fibre 410. Instead of using two independent single mode fibres to transport the classical and quantum signals between the OLT and the passive optical splitter, a few-mode or multi-mode fibre 410 is used, which permits transmission of several spatial modes in the same waveguide. The figure shows an illustration of two of these modes, referred to as LP01 and LP11 (where LP stands for linearly polarized). LP modes are paraxial solutions (propagating approximately parallel to the fibre axis) of the wave equation in the optical fibre. Their electrical and magnetic field is approximately orthogonal to the fibre axis, hence they are approximately transverse electromagnetic (TEM). These solutions exist in the limit of a weakly guiding waveguide where the index of refraction difference between core and cladding is small.

Each mode has two orthogonal states of polarisation, as in a normal single-mode fibre (e.g. LP01 horizontal and LP01 vertical). The different LP modes have a different radial electric and magnetic field distribution as indicated in the figure. In other words, the modes travel along different spatial paths in the waveguide, although there may be some overlap. The modes are de-coupled, i.e. light from one mode is unlikely to couple into a different mode. Light in mode LP11 travels along a path further from the centre of the fibre than light in mode LP01. This allows mode LP01 or LP11 to be selectively excited by launching the light at a position central to the fibre core or offset to the fibre core, respectively.

Few-mode and multi-mode fibres are fibres with larger diameter cores which support transmission of more than one spatial mode. Few-mode fibres are only slightly larger than single-mode fibres and support only a few extra spatial modes. This allows transmission over much longer distances than with multi-mode fibres because the modes do not couple strongly. In one embodiment, the few-mode fibre is configured to transmit less than ten spatial modes. In one embodiment, the few-mode fibre is configured to transmit less than twenty spatial modes. In one embodiment, the few-mode fibre is configured to transmit less than fifty spatial modes. In one embodiment, the few-mode fibre is configured to transmit two spatial modes. In one embodiment, the few-mode fibre is configured to transmit four spatial modes. The diameter of the few mode fibre core depends on the specific fibre type, and such factors as the index of refraction of the core and cladding, and the wavelength. In an embodiment, the diameter of a few-mode fibre core is 10 to 50 μm. In an embodiment, the diameter of a few-mode fibre core is 10 to 20 μm.

Few-mode or multi-mode fibre 410 is connected to spatial mode de-multiplexer 408. A spatial mode de-multiplexer 408 separates signals transmitted in different spatial modes, and is also referred to as a photonic lantern. Spatial mode de-multiplexer 408 directs input signals from fibre 410 in mode LP01 into a first single-mode waveguide and input signals from fibre 410 in mode LP11 into a second single-mode waveguide. These single mode waveguides are connected to 2×N passive optical splitter 409. N single-mode fibres 402-1 to 402-N are connected to output ports of passive optical splitter 409.

In one embodiment, the spatial mode de-multiplexer 408 comprises a fibre bundle, wherein the outer diameter of the cladding of each fibre in the fibre bundle is tapered at one end such that each fibre in the fibre bundle is optically coupled to a different spatial mode in the multi-mode fibre 410. The taper is used to guide the light of the different fibres into the core. The light from the different optical fibres in the bundle is launched into a single multi-mode core. In one embodiment, the multi-mode core is 10 um wide. Light exiting the tapered end of the fibre excites mainly one spatial mode. A first optical fibre in the fibre bundle may be optically coupled at the other end to the first waveguide and a second optical fibre in the fibre bundle may be optically coupled at the other end to the second waveguide.

In another embodiment, the spatial mode de-multiplexer 408 comprises a photonic chip, comprising 3D waveguides. The chip is formed of a suitable material, into which the 3D waveguides are inscribed with a laser. At one end of the photonic chip the 3D waveguides are spaced out evenly and connected to a V-groove array of single-mode fibres, for example the first waveguide, the second waveguide etc. At the other end, the 3D waveguides are close together, such that the light from the different optical fibres in the bundle is launched into a single multi-mode core. The multi-mode fibre is then connected to this side of the chip.

Signals inputted into spatial mode de-multiplexer 408 from the first waveguide are directed into fibre 410 in mode LP01, and signals inputted into spatial mode de-multiplexer 408 from the second waveguide are directed into fibre 410 in mode LP11.

The passive optical splitter 409 may be an M×N passive optical splitter where M≥2 and N≥2, allowing use of more than 2 spatial modes in a few-mode fibre.

In one embodiment, the passive optical splitter and the spatial mode de-multiplexer are integrated onto a single photonic chip.

Figure 4B:
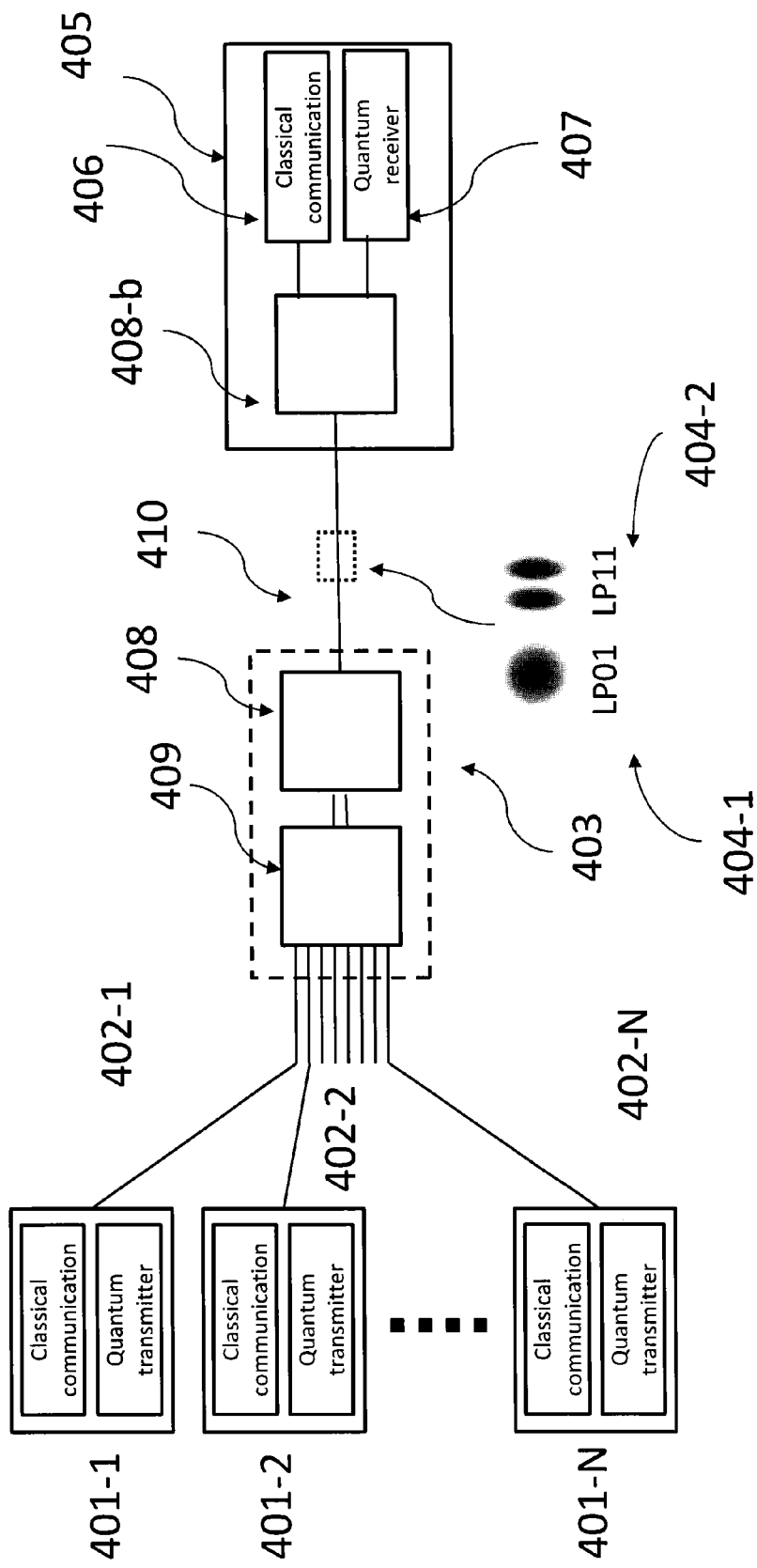
FIG. 4B shows a quantum communication system in accordance with an embodiment, comprising the splitting unit of FIG. 4A.

FIG. 4B shows a quantum communication system in accordance with an embodiment. The system comprises N ONUs 401-1 to 401-N. Each ONU comprises a quantum transmitter and a classical communication device. Each ONU 401-1 to 401-N is optically coupled to an output port of a 2×N passive optical splitter 409 through an optical fibre 402-1 to 402-N. The 2×N passive optical splitter 409 is optically coupled to spatial mode de-multiplexer 408 via a first waveguide and a second waveguide.

Few-mode or multi-mode fibre 410 is also connected to spatial mode de-multiplexer 408. Spatial mode de-multiplexer directs signals inputted from the first waveguide into mode LP01 in the few-mode fibre 410, and signals inputted from the second waveguide into mode LP11 in the few mode fibre 410. Few-mode fibre 410 is optically coupled to OLT 405. OLT 405 comprises a classical communication device 406 and a quantum receiver 407. OLT 405 also comprises a second spatial mode de-multiplexer 408-*b*. Few-mode fibre 410 is optically coupled to second spatial mode de-multiplexer 408-*b*. A first waveguide connects between the second spatial mode de-multiplexer 408-*b* and the classical communication device 406 and a second waveguide connects between the second spatial mode de-multiplexer 408-*b* and the quantum receiver 407. Second spatial mode de-multiplexer 408-*b* directs signals input from the classical communication device 406 into mode LP01 only, for example. The first spatial channel 404-1 comprises spatial mode LP01 and the second spatial channel 404-2 comprises spatial mode LP11.

Although a system with N ONUs and a 2×8 passive optical splitter is shown, the passive optical splitter may be a M×N splitter, where M≥2 and N≥2.

Figure 5A:
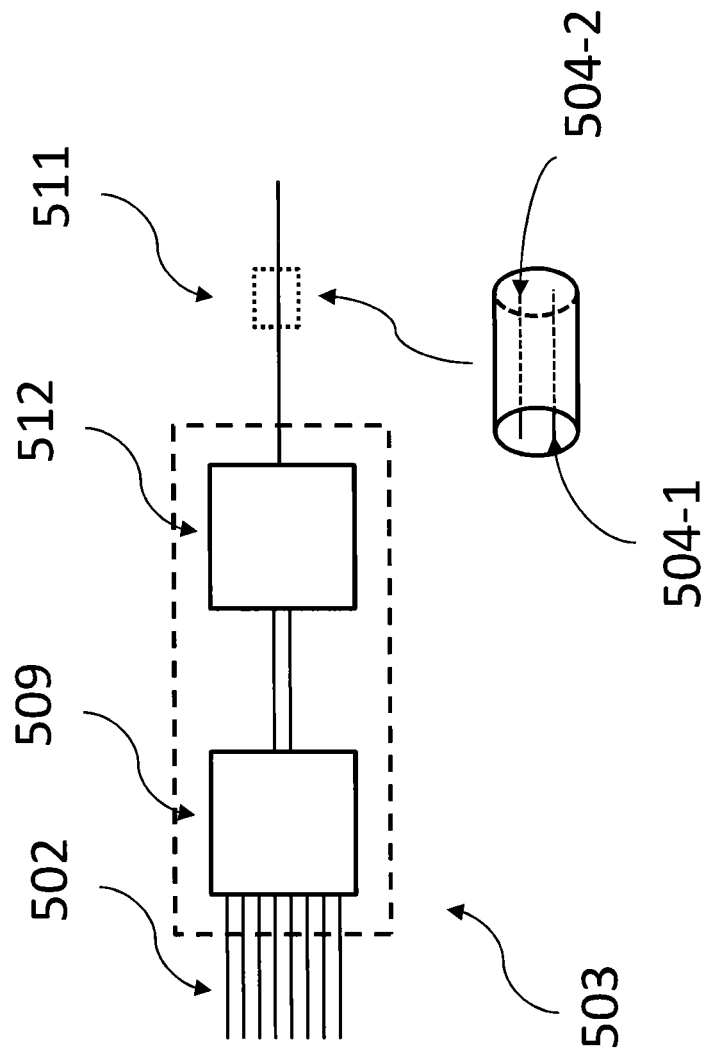
FIG. 5A is a schematic illustration of a splitting unit, connected to multi-core fibre.

FIG. 5A is a schematic illustration of a splitting unit 503, connected to multi-core fibre 511. Instead of two independent single mode fibres to transport the classical and quantum signals between the OLT and the passive optical splitter, a multi-core optical fibre 511 is used which permits transmission of one spatial mode per core.

Multi-core fibre 511 is connected to fan-out 512, which directs downstream signals transmitted from a first core into a first single-mode waveguide and from a second core into a second single-mode waveguide. These single mode waveguides are connected to 2×N passive optical splitter 509. N single-mode fibres 502-1 to 502-N are connected to the output ports of 2×N passive optical splitter 509. Alternatively, an M×N passive optical splitter, where M≥2 and N≥2, can be used for a multi-core fibre with more than 2 cores.

Fan-out 512 directs upstream signals transmitted from the first single-mode waveguide into the first core and signals transmitted from the second single-mode waveguide into the second core.

In one embodiment, the fibre fan-out 512 comprises a fibre bundle, wherein the outer diameter of the cladding of each fibre in the fibre bundle is less than or equal to the smallest distance between the cores in the multi-core fibre. Each fibre in the fibre bundle is optically coupled to a core in the multi-core fibre. The fibre bundle comprises single-mode fibres which have cladding with a reduced diameter compared to a standard single mode fibre. The single-mode fibres with reduced diameter cladding are packed closely together in the fibre-fan-out, and each single-mode fibre is connected to a core in the multi-core fibre. The distance between the cores in the single-mode fibres is equal to the distance between the cores in the multi-core fibre, because the reduced amount of cladding in the single-mode fibres allows them to pack closely together. After they have been packed together, for example with glue, the end face of the packed bundle of single mode fibres is polished and is connected to the multi-core fibre. The cores of the fibre bundle and the multi-core fibre have to be aligned, e.g. by measuring the transmission loss of the different cores. A first optical fibre in the fibre bundle may be optically coupled at the other end to the first waveguide and a second optical fibre in the fibre bundle may be optically coupled at the other end to the second waveguide.

In another embodiment, the fibre fan-out 512 comprises a photonic chip, comprising 3D waveguides. The chip is formed of a suitable material, into which the 3D waveguides are inscribed with a laser. At one end of the photonic chip the 3D waveguides are spaced out evenly and connected to a V-groove array of single-mode fibres, for example the first waveguide, the second waveguide etc. At the other end, the 3D waveguides are close together, such that the spacing matches the core configuration of the multi-core fibre. The multi-core fibre is then connected to this side of the chip.

Fan-outs are used to connect several single-mode fibres with a multi-core fibre, in order to launch signals into the different cores.

In one embodiment, the passive optical splitter and the fibre fan-out are integrated onto a single photonic chip.

Figure 5B:
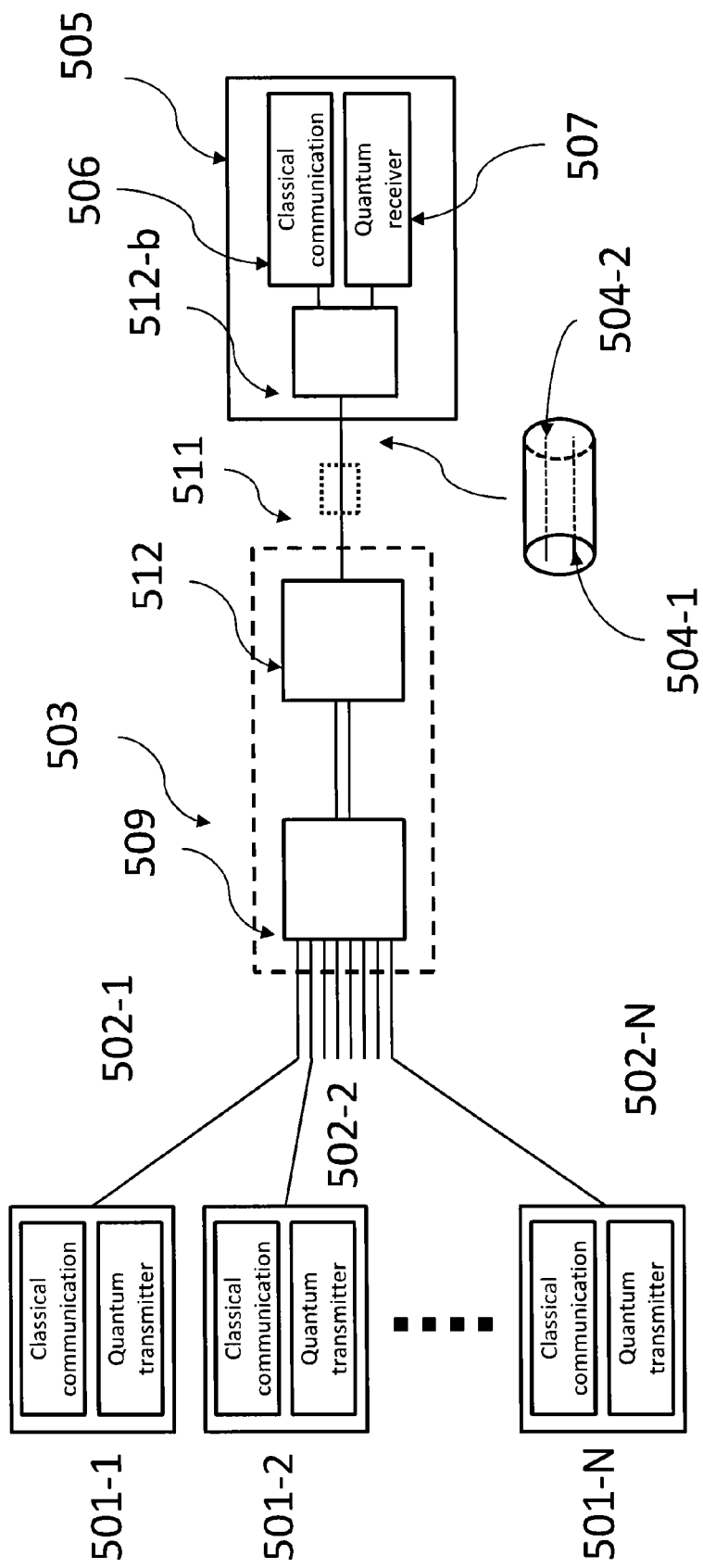
FIG. 5B shows a quantum communication system in accordance with an embodiment, comprising the splitting unit of FIG. 5A.

FIG. 5B shows a quantum communication system in accordance with an embodiment. The system comprises N ONUs 501-1 to 501-N. Each ONU comprises a quantum transmitter and a classical communication device. Each ONU 501-1 to 501-N is optically coupled to an output port of a 2×N passive optical splitter 509 through an optical fibre 502-1 to 502-N. The 2×N passive optical splitter 509 is optically coupled to fan out 512 via a first waveguide and a second waveguide.

Although a system with N ONUs and a 2×8 passive optical splitter is shown, the passive optical splitter may be a M×N passive optical splitter, where M≥2 and N≥2.

Multi-core fibre 510 is also connected to fan out 512. Fan out 512 directs signals inputted from the first waveguide into a first core in the multi-core fibre 511, and signals inputted from the second waveguide into a second core in the multi-core fibre 511.

Multi-core fibre 511 is optically coupled to OLT 505. OLT 505 comprises a classical communication device 506 and a quantum receiver 507. OLT 505 also comprises a second fibre fan-out 512-b. Multi-core fibre 510 is optically coupled to second fibre fan-out 512-b. A first waveguide connects between the second fibre fan-out 512-b and the classical communication device 506 and a second waveguide connects between the second fibre fan-out 512-b and the quantum receiver 507. Second fibre fan-out 512-b directs signals input from the classical communication device 506 into the first core only, for example. The first spatial channel 504-1 comprises the first core and the second spatial channel 504-2 comprises the second core.

Figure 5C:
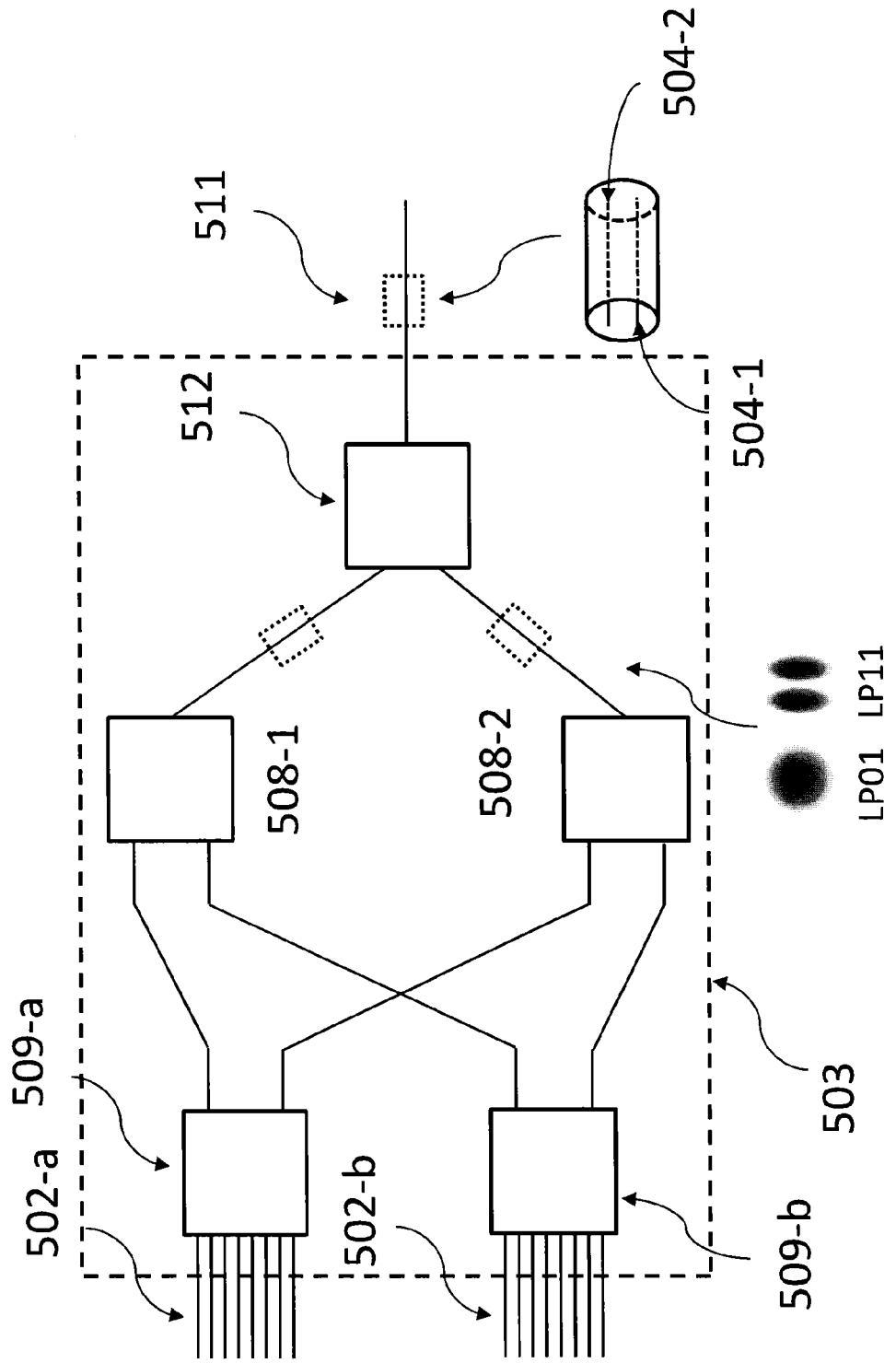
FIG. 5C is a schematic illustration of a splitting unit, connected to a multi-core fibre in which each core in the multi-core fibre is a multi-mode fibre.

FIG. 5C is a schematic illustration of a splitting unit 503, in which each core in the multi-core waveguide 511 is a multi-mode waveguide, such as multi-mode waveguide 410 described in relation to FIG. 4 above. The splitting unit 503 may comprise a fibre fan-out 512, a plurality of spatial mode de-multiplexers 508-1 and 508-2, and a plurality of passive optical splitters 509-a and 509-b. The multi-core fibre 511 is connected to the fibre-fan out.

The fibre-fan out 512 is configured to optically couple the first core in the multi-core fibre 511 to a first multi-mode fibre and the second core in the multi-core fibre 511 to a second multi-mode fibre.

The first multi-mode fibre is connected to a first spatial mode de-multiplexer 508-1 and the second multi-mode fibre is connected to a second spatial mode de-multiplexer 508-2.

The first spatial mode de-multiplexer 508-1 is configured to optically couple a first spatial mode in the first multi-mode fibre to a first waveguide. The first spatial mode de-multiplexer 508-1 is configured to optically couple a second spatial mode in the first multi-mode fibre to a second waveguide, and so on.

The second spatial mode de-multiplexer 508-2 is configured to optically couple a first spatial mode in the second multi-mode fibre to a third waveguide. The second spatial mode de-multiplexer 508-2 is configured to optically couple a second spatial mode in the second multi-mode fibre to a fourth waveguide and so on.

The first waveguide is connected to a first output of a 2×N passive optical splitter 509-a. The second waveguide is connected to a first output of a 2×M passive optical splitter 509-b. The third waveguide is connected to a second output of the 2×N passive optical splitter 509-a. The fourth waveguide is connected to a second output of the 2×M passive optical splitter 509-b, and so on.

The inputs of the passive optical splitter 509-a are connected to the distribution fibres 502-a which are coupled to N ONUs. The inputs of the passive optical splitter 509-b are connected to the distribution fibres 502-b which are coupled to M further ONUs.

The system shown in FIG. 5C allows several classical signals to be transmitted in the first core and several quantum signals to be transmitted in the second core. These are then distributed to passive optical splitters which each have a number of ONUs connected. These can be thought of as separate networks, or sub-networks, each defined by the passive optical splitter. This configuration allows a large number of ONUs to be connected to the OLT. The OLT may contain several transceivers, one for each of the sub networks. It may also contain several quantum receivers.

Figure 6:
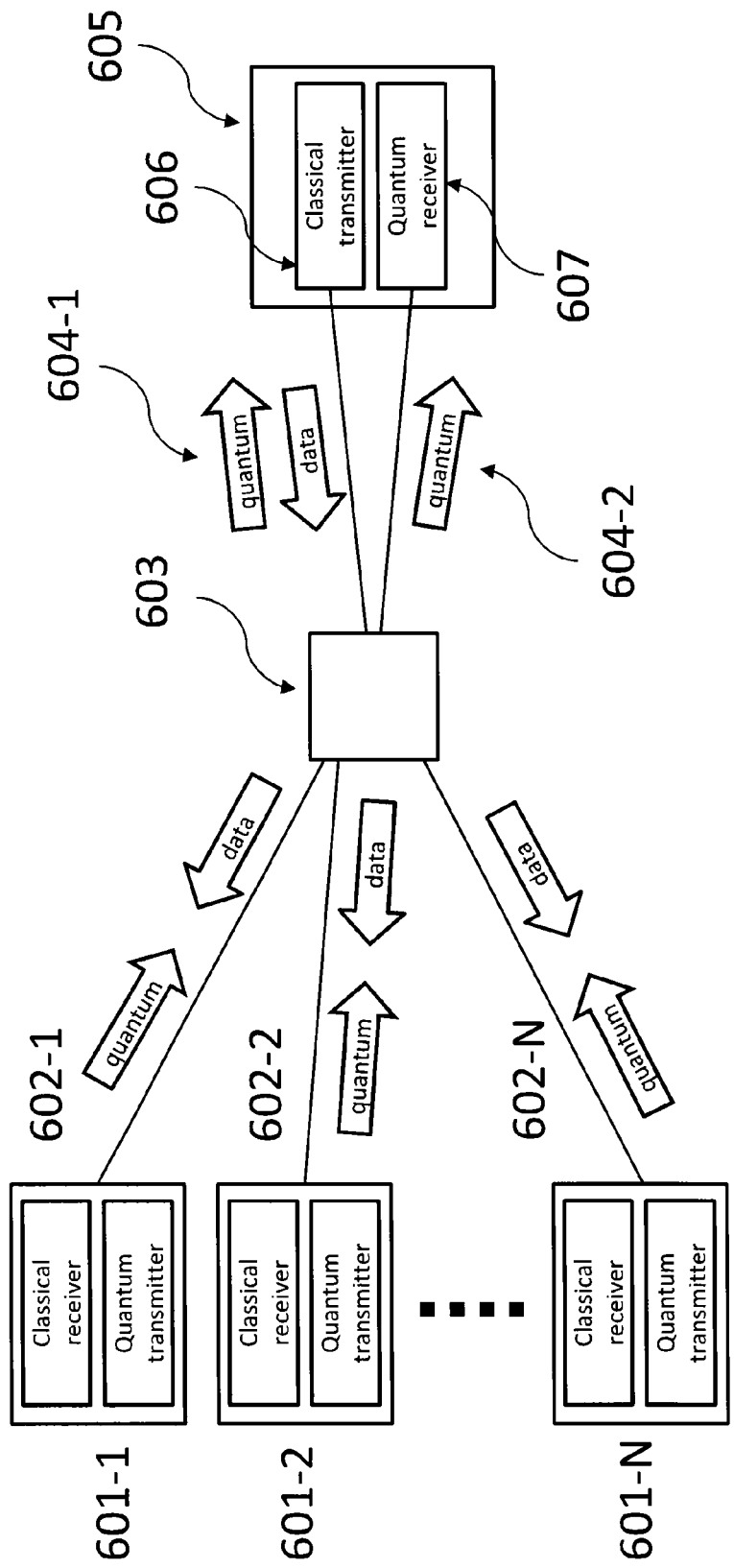
FIG. 6 is a schematic illustration of a quantum communication system in accordance with an embodiment, showing transmission of classical and quantum signals.

FIG. 6 is a schematic illustration of a quantum communication system in accordance with an embodiment. The quantum communication system comprises a plurality of ONUs 601-1 to 601-N. Each ONU comprises a quantum transmitter and a classical receiver. Each ONU 601-1 to 601-N is optically coupled to splitting unit 603 through spatial channels 602-1 to 602-N. The splitting unit 603 is optically coupled to OLT 605. OLT 605 comprises a classical transmitter 606 and a quantum receiver 607. Classical transmitter 606 is optically coupled to splitting unit 603 through spatial channel 604-1 and quantum receiver 607 is optically coupled to splitting unit 603 through spatial channel 604-2. Classical data signals travel between splitting unit 603 and classical communication device 606 via spatial channel 604-1. Quantum signals travel between the splitting unit 603 and quantum receiver 607 via spatial channel 604-2.

In an embodiment, spatial channels 604-1 and 604-2 comprise separate single-mode fibres and splitting unit 603 is a 2×N passive optical splitter such as described in relation to FIG. 3.

In another embodiment, spatial channels 604-1 to 604-2 comprise different modes in a few-mode fibre or a multi-mode fibre and splitting unit 603 is a splitting unit such as splitting unit 403-a or 403-b described in relation to FIG. 4.

In another embodiment, spatial channels 604-1 and 604-2 comprise different cores in a multi-core fibre and splitting unit 603 is a splitting unit such as splitting unit 503 described in relation to FIG. 5.

Downstream classical data signals are transmitted between the OLT 605 and the splitting unit 603 on a separate spatial channel to the quantum signal. N combined quantum and classical ONUs 601-1 to 601-N are connected via splitting unit 603 to classical transmitter 606 and quantum receiver 607.

Classical transmitter 606 launches a data signal in a downstream direction (i.e. from the OLT to the ONUs) into spatial channel 604-1. In one embodiment, the downstream data signal is at 1490 nm. Spatial channel 604-1 may comprise a single mode optical fibre, a core in a multi-core fibre or a mode in a few-mode or multi-mode fibre for example. A fraction 1/N of the data signal is distributed by splitting unit 603 onto each of the N distribution fibres 602-1 to 602-N. In one embodiment, an upstream classical signal may also be sent from the ONUs at 1310 nm.

The quantum transmitters in ONUs 601-1 to 601-N launch a quantum signal upstream into distribution fibres 602-1 to 602-N. In one embodiment, the quantum signal is at 1550 nm. The upstream quantum signal from an ONU and the downstream data signal travel along the same spatial channel 602-1 to 602-N, and are wavelength division multiplexed. Only a fraction 1/N of the quantum signal reaches the quantum/conventional receiver in the OLT. The rest of the light is blocked in the splitter.

There will be Raman noise from the downstream data signal in the quantum wavelength band in the spatial channels 602-1 to 602-N. The downstream Raman noise generated in the distribution fibres 602-1 to 602-N is split as much as the quantum signal (and the upstream signal) by the splitter.

The backscattered light in the fibre 604-2 caused by the data signal is split by the passive optical splitter in the splitting unit 603.

A signal travelling through a M×N passive optical splitter (where N>M) from one of the M inputs to the N outputs is split between the N outputs. There are less inputs than outputs, thus for a signal traveling through the splitter in the other direction (from one of the N outputs to the M inputs) a fraction (N−M)/N of the signal is lost, or blocked in the splitter.

In the system shown in FIG. 6, the downstream signal is split at the passive optical splitter, and a fraction 1/N of the downstream power travels along each distribution fibre 602-1 to 602-N. In each fibre Raman noise is generated. Backscattered light passes through the passive optical splitter again in the direction from the outputs to the inputs. The backscattered signal is split by the passive optical splitter, and a fraction 1/N of the backscattered signal is transmitted into the fibre 604-1 and a fraction 1/N is transmitted into fibre 604-2. A fraction (N−2)/M of the backscattered light is blocked by the splitter.

Only a fraction 1/N of the Raman noise generated reaches the quantum transmitters.

The fraction 1/N of the upstream quantum signals are distributed on both spatial input channels 604-1 and 604-2. Only the quantum signals distributed into spatial channel 604-2 are picked up by quantum receiver 607. The upstream quantum signals are time-division multiplexed, such that the signal from all of the ONUs 601-1 to 601-N can share the same spatial channel 604-2, e.g. in a single optical fibre. The combined output of the splitting unit 603 is connected with the quantum receiver 607.

The single quantum receiver 607 receives quantum signals from multiple ONUs 601-1 to 601-N. The quantum signals from the multiple transmitters are temporally interleaved at the splitting unit 603. The receiver 607 may comprise a decoder and detector sub-system (not shown).

The splitting unit 603 comprises a passive optical splitter. The quantum channel and the classical channel are both optically coupled to the passive optical splitter. In one embodiment, further components (for example filters) located between the ONUs 601-1 to 601-N and the splitting unit 603, used to direct signals from and into the correct components in the splitting unit 603, are not used. In other words, in one embodiment, filters to direct the quantum signals to a certain component in the splitting unit 603 and classical signals to another component in the splitting unit 603 are not used, because both signals are distributed by the same passive optical splitter.

Signals inputted into the splitting unit 603 from the ONUs are split and sent down both spatial channels to the OLT 605. Signals from the OLT 605 are split and sent down all spatial channels to the ONUs. The passive optical splitter splits the signal between the spatial channels. It does not direct the signal into or from a particular channel.

In an embodiment, all of the optical components in the splitting unit 603 are optically coupled to the quantum receiver through a first spatial channel 604-2 and are also optically coupled to the first classical communication device through a second spatial channel 604-1. In other words, both the quantum and classical channel are coupled to the same optical components within the splitting unit 603. For example, where the splitting unit 603 is a 2×N passive optical splitter such as described in relation to FIG. 3, both spatial channels 604-1 and 604-2 are coupled to a single 2×N passive optical splitter 303. Where the splitting unit 603 is as described in relation to FIG. 4, both spatial channels 604-1 and 604-2 optically couple to the spatial mode de-multiplexer 408 and to the passive optical splitter 409. Where the splitting unit 603 is as described in relation to FIG. 5, both spatial channels 604-1 and 604-2 optically couple to the fibre fan-out 512 and the passive optical splitter 509.

The quantum and/or data signals may be transmitted in several separate wavelength or polarization channels. Furthermore, as the passive optical splitter does not select or split the signals based on wavelength, any wavelength may be used to transmit either the quantum or data signals. As described above, the passive optical splitter is wavelength independent over a certain wavelength range, for example the telecom C, O, or L band. It does not reflect or transmit light depending on its wavelength. By wavelength independent, it is meant that any wavelength dependence is sufficiently small such that it does not affect the functionality of the device. In one embodiment, the splitting ratio between the inputs and outputs of the passive optical splitter changes by less than 20% over the specified wavelength range. In one embodiment, the splitting ratio between inputs and outputs of the passive optical splitter changes by less than 10% over the specified wavelength range, In one embodiment, the splitting ratio between inputs and outputs of the passive optical splitter changes by less than 50% over the specified wavelength range.

In FIG. 6, the classical communication is depicted with a downstream data signal only. The downstream data signal may be broadcast to all of the ONUs. However, the ONUs 601-1 to 601-N and the OLT 605 may all comprise both classical transmitters and receivers. Any upstream classical data signal launched by the ONUs 601-1 to 601-N into the distribution fibres 602-1 to 602-N is distributed into both spatial channels 604-1 and 604-2, like the quantum signal. Only the fraction 1/N of the upstream classical signal distributed into channel 604-1 is picked up by the classical receiver in the OLT 605. A wavelength filter in front of the quantum receiver 607 may be included to prevent the upstream classical data signal from entering the quantum receiver 607. The quantum signal is weak enough that it does not affect the classical signal at the classical communication device 606. The upstream classical data from the ONUs may be time division multiplexed.

FIG. 6 shows an optical network transmitting both quantum and classical communication signals. It is based on the upstream quantum access network architecture. Several combined quantum transmitters and classical receivers 601-1 to 601-N are connected to quantum receiver 607 and classical transmitter 606 via splitting unit 603, which comprises a wavelength independent passive optical splitter. The classical data signal is launched into spatial channel 604-1 and split N-fold by splitting unit 603 into spatial channels 602-1 to 602-Ns. The quantum signals are launched upstream by endpoints 601-1 to 601-N and combined by splitting unit 603 onto spatial channels 604-1 and 604-2. Only the quantum signal travelling along channel 604-2 is picked up by quantum receiver 607. The separation of the quantum and downstream classical signal into different spatial channels means that photons generated from Raman backscattering of the downstream classical signal does not reach the quantum receiver 607.

Figure 7:
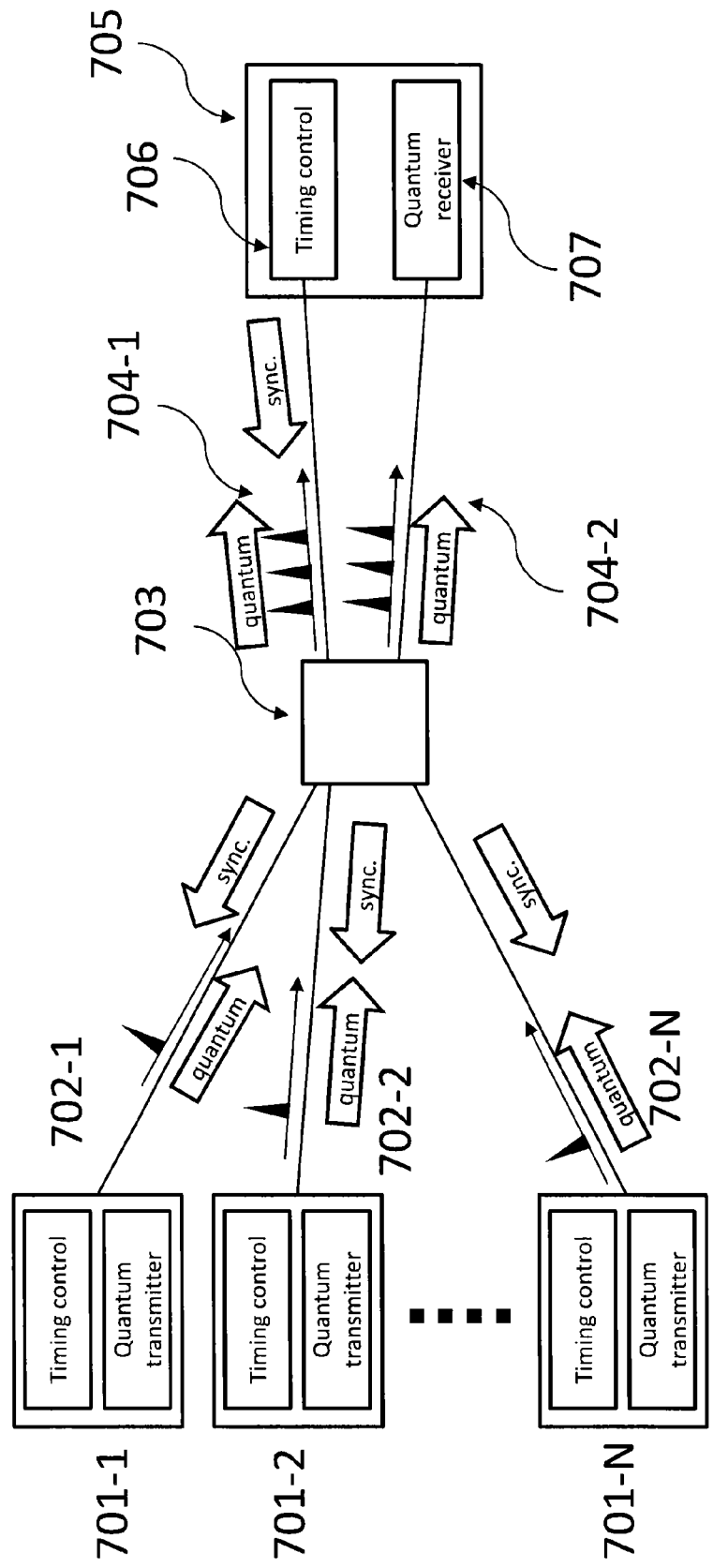
FIG. 7 is a schematic illustration of a quantum communication system in accordance with an embodiment, showing transmission of classical synchronisation signals and quantum signals.

FIG. 7 is a schematic illustration of a quantum communication system in accordance with an embodiment. Both quantum and synchronization signals are transmitted, wherein the synchronization signal is transmitted on a separate optical spatial channel to the quantum signal. The synchronization signal may be a separate signal, such as a master clock signal. Alternatively, the system clock can be generated at the quantum transmitter side from the data that is sent over the classical channel from the quantum receiver side, without sending a dedicated synchronisation signal.

The quantum communication system comprises a plurality of ONUs 701-1 to 701-N. Each ONU comprises a quantum transmitter and a classical receiver. Each ONU 701-1 to 701-N is optically coupled to splitting unit 703 through spatial channels 702-1 to 702-N. The splitting unit 703 is optically coupled to OLT 705. OLT 705 comprises a timing control module 706 and a quantum receiver 707. Timing control module 706 is optically coupled to splitting unit 703 through spatial channel 704-1 and quantum receiver 707 is optically coupled to splitting unit 703 through spatial channel 704-2. Timing synchronisation signals travel between splitting unit 703 and timing control module 706 via spatial channel 704-1. Quantum signals travel between the splitting unit 703 and quantum receiver 707 via spatial channel 704-2.

In an embodiment, spatial channels 704-1 and 704-2 comprise separate single-mode fibres and splitting unit 703 is a 2×N passive optical splitter such as described in relation to FIG. 3.

In another embodiment, spatial channels 704-1 to 704-2 comprise different modes in a few-mode fibre or a multi-mode fibre and splitting unit 703 is an splitting unit such as splitting unit 403-a or 403-b described in relation to FIG. 4.

In another embodiment, spatial channels 704-1 and 704-2 comprise different cores in a multi-core fibre and splitting unit 703 is an splitting unit such as splitting unit 503 described in relation to FIG. 5.

Timing synchronisation signals are transmitted between the OLT 705 and the splitting unit 703 on a separate optical spatial channel to the quantum signal. N combined quantum and classical ONUs 701-1 to 701-N are connected via splitting unit 703 to timing control module 706 and quantum receiver 707.

Timing control module 706 sends synchronisation signals in the downstream direction (i.e. from the OLT to the ONUs) into spatial channel 704-1. In one embodiment, the synchronisation signal has a wavelength greater than 1500 nm. In one embodiment, the synchronisation signal is at 1610 nm. Spatial channel 704-1 may comprise a single mode optical fibre, a core in a multi-core fibre or a mode in a few-mode or multi-mode fibre. A fraction 1/N of the data signal may be distributed by splitting unit 703 onto each of the N distribution fibres 702-1 to 702-N.

The quantum transmitters in ONUs 701-1 to 701-N launch a quantum signal upstream into distribution fibres 702-1 to 702-N. In one embodiment, the quantum signal is at 1550 nm. The quantum signal from an ONU and the synchronisation signal travel along the same spatial channel, and are wavelength division multiplexed. There may be Raman noise from the synchronisation signal in the quantum wavelength band.

The fraction 1/N of the upstream quantum signals are distributed on both spatial input channels 704-1 and 704-2. Only the quantum signals distributed into spatial channel 704-2 are picked up by quantum receiver 707. The upstream quantum signals are time-division multiplexed, such that the signal from all of the ONUs 701-1 to 701-N can share the same spatial channel, e.g. in a single optical fibre. The combined output of the splitting unit 703 is connected with the receiver 707.

The single quantum receiver 707 receives quantum signals from multiple ONUs 701-1 to 701-N. The quantum signals are temporally interleaved at the splitting unit 703. The quantum receiver 707 may comprise a decoder and detector sub-system (not shown).

The timing control module 706 provides a master clock signal to which each ONU 701-1 to 701-N is synchronised. At any receiver clock period, at most one ONU 701-1 to 701-N is allowed to transmit a pulse encoded with quantum information. The timing control module 706 outputs the master clock signal and allows the OLT 705 to identify which ONU 701-1 to 701-N has transmitted the pulse which it has just received.

The source in each transmitter of the ONUs 701-1 to 701-N can be controlled such that the output of quantum signals is delayed to produce a combined optical signal after the splitting unit 703 which is a train of light pulses with time intervals regulated by the OLT's 705 master clock.

Time slots for each emission from each ONU 701-1 to 701-N can be pre-agreed between the ONUs 701-1 to 701-N and the OLT 705 to avoid collision of quantum signals. To achieve this, the timing control module 706 can allocate time slots to each ONUs 701-1 to 701-N. In an embodiment, and as shown in FIG. 7, each quantum transmitter may transmit a pulse in turn with 1/N of the master clock frequency. Alternatively, each quantum transmitter may transmit a number of pulses, or an entire quantum key in turn.

The quantum signals with regular arrivals are detected by the detector subsystem in the quantum receiver 707. Following each detection event, the OLT 705 may first identify the ONU 701-1 to 701-N which sent the photon which gave rise to the detection event, from the arrival time of the photon.

Figure 8:
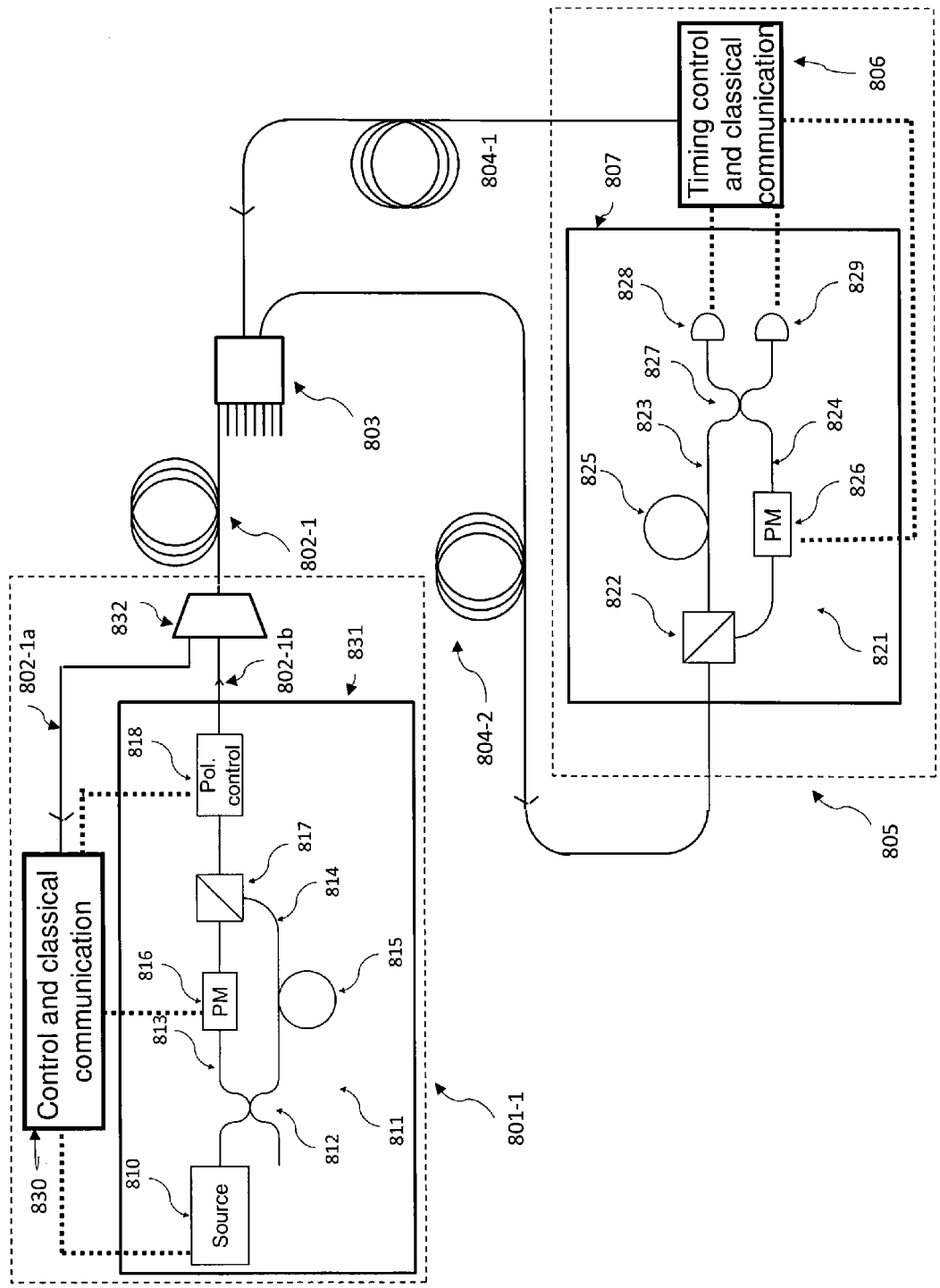
FIG. 8 is a schematic illustration of a quantum communication system in accordance with an embodiment, where the quantum transmitter and the quantum receiver are based on asymmetrical Mach-Zehnder interferometers.

FIG. 8 is a schematic illustration of a quantum communication system in accordance with an embodiment, where the quantum transmitter 831 and the quantum receiver 807 are based on asymmetrical Mach-Zehnder interferometers (MZI). Transmitter unit 801-1 comprises quantum transmitter 831 and classical communication device 830. Receiver unit 805 comprises quantum receiver 807 and classical communication device 806. Quantum transmitter 831 and quantum receiver 807 are connected through fibre 802-1b, wavelength division multiplexer 832, fibre 802-1, splitting unit 803 and spatial channel 804-2. Classical communication device 830 and classical communication device 806 are connected through fibre 802-1a, wavelength division multiplexer 832, fibre 802-1, splitting unit 803 and spatial channel 804-1. This is referred to as the classical channel.

In an embodiment, spatial channels 804-1 and 804-2 comprise separate single-mode fibres and splitting unit 803 is a 2×N passive optical splitter such as described in relation to FIG. 3.

In another embodiment, spatial channels 804-1 and 804-2 comprise different modes in a few-mode fibre or a multi-mode fibre and splitting unit 803 is an splitting unit such as splitting unit 403-a or 403-b described in relation to FIG. 4.

In another embodiment, spatial channels 804-1 and 804-2 comprise different cores in a multi-core fibre and splitting unit 803 is a splitting unit such as splitting unit 503 described in relation to FIG. 5.

Each fibre 802-1 to 802-N connected to splitting unit 803 is connected to a separate quantum transmitter, such that a plurality of transmitters are connected to the receiver 807 through the splitting unit 803. However, for simplicity, only one transmitter is shown in the drawing.

Photon source 810 inside quantum transmitter 831 generates a quantum signal, comprising pulses of light. The pulses are then encoded using the asymmetrical MZI 811. The pulses are directed into a beam splitter 812. One output of the beam splitter 812 is connected to a phase modulator 816. The output of the phase modulator 816 is connected to polarising beam combiner 817. This forms the short arm 813 of the interferometer. The other output of the beam splitter 812 is connected to a fibre loop 815, which is in turn connected to polarising beam combiner 817. This forms the long arm 814 of the interferometer. Light pulses travelling the long arm 814 are delayed with respect to light pulses travelling the short arm 813.

Quantum transmitter 831 may also comprise an intensity modulator configured to vary the intensity of light pulses. The intensity modulator may be configured to realise a decoy-state QKD protocol, in which pulses of different intensities are sent which allows the sender and receiver to determine the presence of an eavesdropper by measuring the number of pulses which have been safely received with the different intensities. The transmitter may comprise more than one intensity modulator.

Phase modulator 816 is configured to apply a modulation to the phase of a light pulse travelling the short arm 813. A phase modulator can comprise a crystal, such as a $LiNbO_3$ crystal, in which the refractive index is a function of electric field strength. Alternatively the phase modulation can be provided by passive means, for example, a plurality of fixed phase elements which are each configured to apply a different fixed phase difference and a switch configured to select each of the said components.

The polarisation of a light pulse travelling from the short arm 813 of the interferometer is flipped by the polarizing beam splitter 817, from a first polarisation to a second polarisation, which is orthogonal to the first polarisation.

The quantum transmitter 831 therefore generates coherent double pulses with a chosen phase difference and orthogonal polarization travelling down the distribution fibre 802-1.

A polarisation controller 818 corrects any deviation of the polarisation of the pulses. Each quantum transmitter at each ONU may use a separate polarisation controller to align the polarisation of the pulses arriving at the receiver individually. The quantum transmitters may be pre-compensated. Alternatively, a single polarisation controller could be installed at the receiver side (OLT).

Quantum light pulses exit the quantum transmitter 831 and are sent via fibre 802-1b to wavelength division multiplexer 832. The quantum signals are transmitted with a first wavelength. Wavelength division multiplexer 832 sends signals inputted from fibre 802-1b into fibre 802-1. The quantum signals are sent via fibre 802-1 to splitting unit 803. In one embodiment, the quantum light pulses are split N-fold by the splitting unit 803, with a fraction 1/N of each of the pulses inserted into the spatial channel 804-2, which is optically coupled to the quantum receiver 807.

In the quantum receiver 807 the pulses are decoded using the asymmetrical MZI 821. The short arm 824 of the interferometer 821 comprises a phase modulator 826, such as has been described previously. The long arm 823 of the interferometer comprises a fibre loop 825, which exactly matches the fibre loop 815 in the transmitter. The long arm 823 and the short arm 824 are each connected to one of the outputs of the polarizing beam splitter 822 and to one of the inputs of beam splitter 827.

The polarizing beam splitter 822 sends a light pulse that enters with the second polarization down the long arm 823 of the interferometer and a light pulse that enters the polarizing beam splitter 822 with the first polarization down the short arm 824. The polarization of a pulse travelling through the polarizing beam splitter 822 with the second polarisation is flipped to the first polarisation.

The outputs of beam splitter 827 are connected to photon detectors 828 and 829. Depending on the phase modulation applied at the transmitter 831 and the receiver 807, a signal will either be detected in photon detector 828 or in photon detector 829. Photon detectors 828 and 829 may be gated single-photon detectors which may be based on avalanche photo-diodes and specifically may be based on InGaAs avalanche photo-diodes. The detectors may be gated detectors such as self-differencing detectors. Self-differencing detectors perform time-filtering automatically. Time-filtering is possible due to the known arrival times of the quantum signals. The detector can be only activated during times photons are incident on the detector. Self-differencing may decrease the Raman noise by a factor of about 10.

Using phase modulator 816 and phase modulator 826 a Quantum Key Distribution protocol such as BB84 can be realized. In the BB84 protocol, Alice (at the transmitter 831) selects a phase value at random from four equally spaced phase values. For example, Alice can randomly set the phase modulator 816 to one of four different values, corresponding to phase shifts of 0, $$\frac{\pi}{2},$$

$\pi$, and $$\frac{3\pi}{2}.$$

0 and $\pi$ are associated with bits 0 and 1 in a first encoding basis, while $$\frac{\pi}{2} \text{ and } \frac{3\pi}{2}$$

are associated with 0 and 1 in a second encoding basis.

Bob (at the receiver 807) can randomly set the phase modulator 826 to one of two values, corresponding to a phase shift of 0 or $$\frac{\pi}{2}.$$

This amounts to selecting between the first and second measurement bases, respectively. In other words, Alice's 0 and $\pi$ values are compatible with Bob's 0 value (first basis), and Alice's $$\frac{\pi}{2} \text{ and } \frac{3\pi}{2}$$

values are compatible with Bob's $$\frac{\pi}{2}$$

value (second basis).

A phase difference of 0 (i.e. the phase shift applied by Alice is 0 and the phase shift applied by Bob is 0 or the phase shift applied by Alice is $$\frac{\pi}{2}$$

and the phase shift applied by Bob is $$\frac{\pi}{2}),$$

leads to a detection at detector 828. If, on the other hand, there is a phase difference of π (i.e. the phase shift applied by Alice is π and the phase shift applied by Bob is 0 or the phase shift applied by Alice is $$\frac{3\pi}{2}$$

and the phase shift applied by Bob is $$\frac{\pi}{2})$$

there will be a detection at detector 829. For any other value of difference between the phase modulation applied at the two phase modulators, there will be a finite probability that a photon may output at detector 828 or detector 829.

Neither Alice nor Bob knows what values the other chooses or will choose when choosing their values. Only afterwards do they compare whether they used the same basis, and then only use the values for the final key where they used the same basis. The results from any measurements performed using a different basis are discarded. This process is known as sifting.

The quantum signals with regular arrivals are detected by the detectors 828 and 829 in the quantum receiver 807. Following each detection event, the transmitter which sent the photon is identified from the arrival time of the photon. Then, the receiver 807 initiates the sifting process by communicating the time arrival and decoding basis with the identified transmitter, from the classical communication device 806 to classical communication device 830. Repeating this process for each detected photon, each one of the transmitters will form a sifted key sequence with the receiver 807 with lengths of, for example, at least a few thousands bits. Then, the transmitter and the receiver can start error correction and privacy amplification processes to distil a perfectly secret key between them. The classical communication device 806 may perform classical communication between the transmitter and the receiver for error correction and privacy amplification.

The system of FIG. 8 is an example of how to implement a QKD network with multiple transmitters sharing a single receiver using the BB84 protocol. Other quantum communication protocols and optical setups can also be implemented, for example, coherent-one-way protocol or differential phase shift protocol.

In an embodiment, classical signals sent between the classical communication device 830 and the classical communication device 806 are sent at a second wavelength, which is different to the first wavelength at which the quantum signals are transmitted. Transmission from classical communication device 806 is transmitted along spatial channel 804-1, and a fraction of the signal is distributed into each distribution fibre 802-1 to 802-N by splitting unit 803. The fraction of the classical signal in distribution fibre 802-1 is transmitted to wavelength division multiplexer 832. Signals inputted into the wavelength division multiplexer 832 from fibre 802-1 with a second wavelength are directed into fibre 802-1a, which is connected to classical communication device 830. The wavelength division multiplexer 832 therefore directs the classical signals to the classical communication device 830.

WDM couplers (also referred to as WDM modules or wavelength filters) may be based on thin-film wavelength filters. A first filter reflects or transmits a selected wavelength and lets all other wavelengths pass. The remaining light is sent onto a second filter, which reflects or transmits a second selected wavelength and lets all other wavelengths pass, and so on. Other types of WDM modules may be based on arrayed waveguide gratings (AWGs). These may be integrated on a chip and use interference to direct light of a selected wavelength into a selected waveguide. Other types of WDM modules may be based on fibre Bragg gratings, which are gratings inscribed into an optical fibre which reflect or transmit a selected wavelength.

A synchronisation channel is realised through the classical channel. A synchronisation signal such as a master clock signal may be sent over the classical channel. Alternatively, no separate synchronisation signal is sent, but the clock is recovered from the classical data stream.

The classical signal can be composed of several signals transmitted at different wavelengths. This could be, for example, a data signal at 1490 nm and a master clock signal at 1610 nm. The WDM component can direct several wavelengths onto fibre 802-1a. In other words, it can selectively separate a single wavelength (the quantum signal) from other wavelengths.

In an embodiment, a timing control module in the receiver provides a master clock signal to which each transmitter is synchronised. The master clock signal is transmitted from the classical communication device 806 to the classical communication device 830 in the transmitter unit. At any receiver clock period, at most one transmitter is allowed to transmit a pulse encoded with quantum information. The master clock signal allows the receiver to identify which transmitter has transmitted the pulse which it has just received.

The quantum source in each transmitter can be controlled such that the output of quantum light pulses from each transmitter unit is delayed to produce a combined optical signal after the splitting unit 803. The combined optical signal is a train of pulses with time intervals regulated by the receiver's master clock. Time slots for each emission for each transmitter can be pre-agreed between the transmitters and the receiver to avoid collision of pulses. To achieve this, the timing control module in the receiver unit 805 can allocate time slots to each transmitter unit, and each transmitter unit then transmits a pulse in turn with 1/N of the master clock frequency. Alternatively, each quantum transmitter may transmit a number of pulses, or an entire quantum key in turn. The time slot allocation occurs over the classical channel. The classical data is transmitted in frames. These frames can contain management data, which for example specifies which ONU is allowed to transmit when.

The timing control module in the receiver may provide the system master clock, drive the phase modulator 826 and gated detectors 829 and 828 in the quantum receiver 807, and accept photon detection results from the detectors 829 and 828. The master clock signal is sent from the timing control module to the classical communication device 806 and then transmitted to classical communication device 830. Transmission of the master clock is realized optically using the classical channel.

The master clock may be determined by the speed of the single photon detectors in the quantum receiver 807. For example, for self-differencing InGaAs APDs based single photon detectors, the master clock can be operated at 1 GHz or higher. In one embodiment, at least the transmitted clock signal would be at a lower frequency. For example, the transmitted clock signal may be at 250 MHz, 25 MHz or 10 MHz.

The master clock may be transmitted at a wavelength that is different from any of the quantum signals from the quantum transmitters.

Each transmitter unit 801-1 to 801-N comprises a classical communication device 830 and a quantum transmitter 831. The classical communication device 830 receives the master clock signal from the classical communication device 806. The master clock signal is used to drive the source 810. A control unit in the transmitter unit 801-1 generates a trigger signal from the master clock signal. The trigger signal is used to drive the source 810. The control unit may also use the master clock signal to control the phase modulator 816.

During each trigger signal from the control electronics, the source 810 outputs one optical pulse. An intensity modulator may modulate the intensity of each pulse on a pulse-by-pulse basis. Alternatively, direct modulation can be realized by varying amplitude of driving signals applied to the photon source 810.

The signal pulses are then fed into the Mach-Zehnder interferometer 811. The length difference between the two arms of the Mach Zehnder interferometer 811 corresponds to an optical propagation delay of $t_{delay}$. A photon travelling through the long arm 814 will lag a photon travelling through the short arm 813 by a time of $t_{delay}$ at the exit of the interferometer 811.

A trigger signal from the control unit may also be used to control timing of the phase modulator 816, such that a phase modulation is applied when a light pulse is present.

The quantum light pulses are then transmitted to the receiver 807 along fibre 802-1 and through splitting unit 803 and along spatial channel 804-2. The quantum receiver 807 receives the transmitted quantum signal from the splitting unit 803. The signal pulses are fed into the interferometer 821. The polarising beam splitter 822 divides the incident pulses with orthogonal polarization. The phase modulator 826 may also be synchronised with the arrival time of the photons, using the master clock.

Due to the use of polarising components, there are, in ideal cases, only two routes for a signal pulse travelling from the entrance of the encoding interferometer 811 to the exit of the decoding interferometer 821:

i. Long Arm 814-Short Arm 824 (L-S) and
ii. Short Arm 813-Long Arm 823 (S-L).

For initial alignment, a variable delay line may be included in one of the interferometers, and adjusted to make the propagation time along routes (i) and (ii) almost equal, within the signal laser coherence time which may be a few picoseconds. This will ensure interference of the two paths.

The master clock signal may also be used to control the detectors, such that the detectors are gated on during the arrival of those photons that experience interference, i.e., photons travelling through the short arm of one interferometer and the long arm of the other interferometer.

Due to non-ideal polarizations, some photons travel either both short arms or both long arms, thus arriving at the detectors 828 and 829 with a time delay of $\pm t_{delay}$ respective with interfering photons. These non-interfering photons do not contribute to the key generation of key rate. Therefore, detection results of these photons should be discarded.

In order to avoid contamination of interfering photons, appropriate $t_{delay}$ may be chosen to ensure that (1) $t_{delay}$ is longer than the detector time resolution and (2) $t_{delay}$ is shorter than the receiver's system clock period. In one embodiment, $t_{delay}$ is half of the system clock period. For example, for a 1 GHz receiver, $t_{delay}$ is 500 picoseconds.

During quantum communication, a number of physical parameters may be actively stabilized, including the arm length matching between asymmetric Mach-Zehnder interferometers, the photon polarisation, and the photon arrival times. Active stabilisation can be realised by a feedback control unit at the quantum receiver, configured to generate a feedback signal. This feedback signal is then transmitted by the classical communication device 806 to the classical communication device 830. A control unit in the transmitter unit 801-1 then controls a component or components of the quantum transmitter based on the feedback signal Arm length matching can be realised through actively adjusting a tunable phase delay in the transmitter interferometer based on a feedback signal transmitted through the classical channel from the receiver. In one embodiment, the feedback signal is the quantum bit error ratio (QBER). This can be minimised by tuning the tunable phase delay. In other words, the control unit in the quantum transmitter adjusts the tunable phase delay in the MZI each time the QBER feedback signal is received, in order to minimise the QBER.

The QBER is available to send to the transmitter only after each error correction process. The latency in determining the QBER allows compensation of only slow variation of arm lengths.

In an alternative embodiment, it is possible to achieve faster compensation, by sending strong reference pulses through the quantum channel from the transmitter, substituting a small fraction of signal/decoy pulses. These reference pulses are not modulated in phase, and therefore the degree of interference of the reference pulses will indicate the status of the arm length matching. Detection results of the reference pulses can be transmitted to the transmitter through the classical channel to be used as a feedback signal to adjust the tunable phase delay.

The tunable phase delay acts as a control element. It may be a fibre stretcher, driven by a piezo-electric actuator.

Alternatively, the two delays can be balanced by carefully controlling the length of fibre in the two interferometers. Fine adjustment of the length of the two optical paths can be achieved through either tuning the DC bias in the phase modulator in the transmitter, or adding an AC offset to the driving signal applied to the phase modulator.

Alternatively, arm length matching can be realised by adjustment of components in the receiver, for example a tunable phase delay, or the phase modulator. A different adjustment must be applied according to the origin of each incoming pulse.

In one embodiment, the polarisation drift can be actively stabilized using the polarisation controller 818. Ideally, all photons passing through the encoder and decoder experience interference at the beam splitter 827 and contribute to the key formation. However, polarisation drift in the distribution fibre 802-1 and spatial channel 804-2 will cause photons to be routed to the non-interfering paths, such as photons passing through either both long arms or short arms of the two interferometers. These non-interfering photons do not contribute to the key formation. They are automatically rejected in the case with gated photon detectors, or can be rejected using a timing discrimination window in the detector subsystem with free-running single photon detectors. In either case, polarisation drift reduces the photon count rate of interfering photons. By optimising this count rate by adjusting the polarisation controller this drift can be corrected for. In other words, the count rate is transmitted from the classical communication device 811 to the classical communication device 802. The control unit in the transmitter unit 801-1 then adjusts the polarisation controller 818 in order to maximise the count rate.

In one embodiment, the photon arrival time at the detectors 829 and 828 is actively stabilised by tuning the trigger time of the photon source 810 based on the photon detection results. In other words, the photon detection results, such as the count rate and QBER, are transmitted from the classical communication device 811 to the classical communication device 802. The control unit in the transmitter unit then adjusts the trigger time of the photon source 810 in order to optimise the photon detection results.

Figure 9:
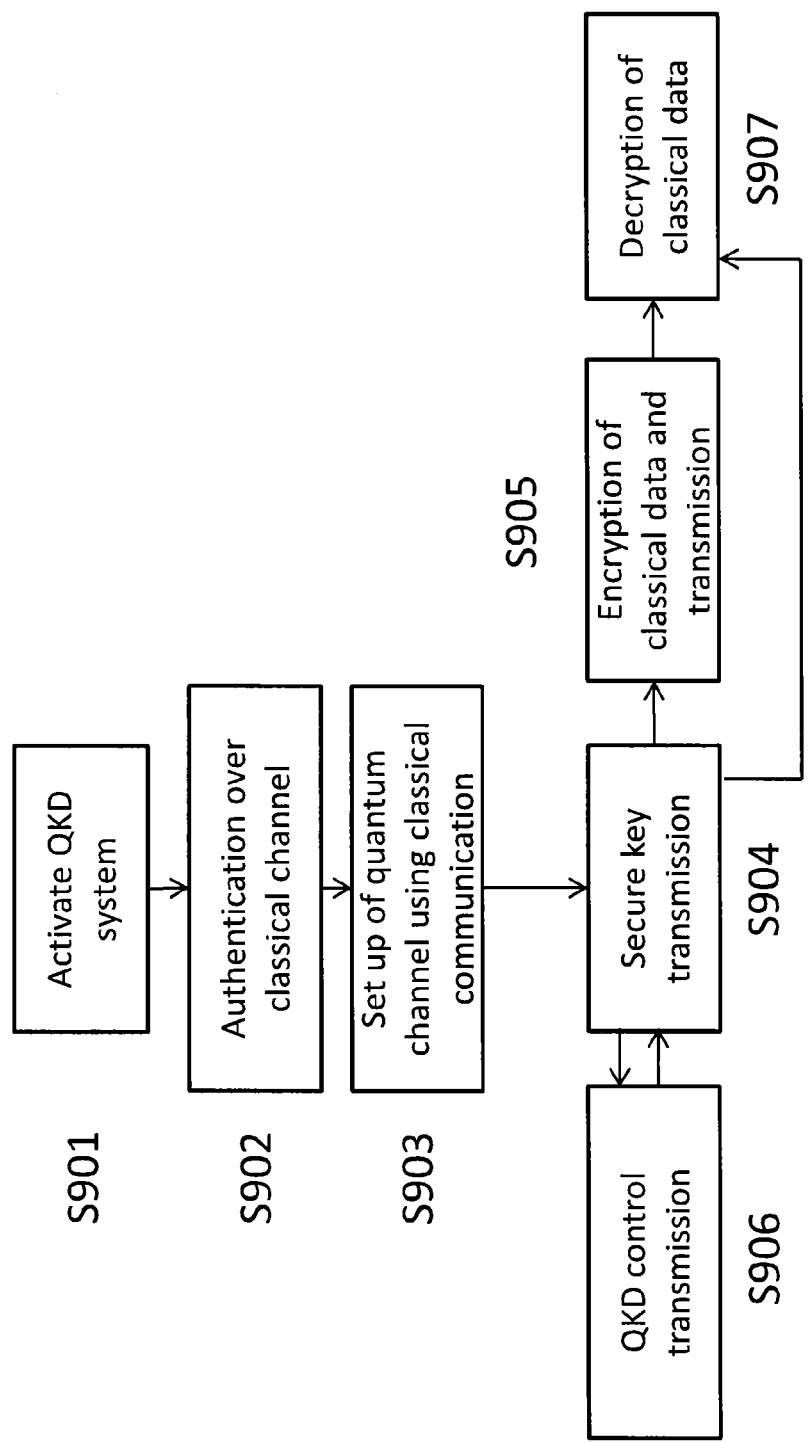
FIG. 9 is a flow diagram illustrating how quantum keys can be used to encrypt classical data signals.

FIG. 9 is a flow diagram illustrating how quantum keys can be used to encrypt classical data signals.

In a QKD system, synchronisation and classical data signals may be transmitted continuously, along with quantum signals generating keys.

In principle, any ONU can pick up any downstream data, which allows for easy eavesdropping of the downstream data. The downstream data may therefore be encrypted. The quantum keys are used to encrypt the downstream data.

In step S901 the QKD system is activated.

In step S902, the quantum link is activated by performing authentication between the quantum transmitter and quantum receiver over the classical channel.

In one embodiment, to perform authentication of the QKD link, encryption keys are pre-stored in each ONU and the OLT. Each ONU will have a different key, whereas the OLT will have all of the keys. These keys are used to start up each QKD link securely and independently (such that ONU1 cannot encrypt data encrypted for ONU2, and so on). The OLT knows all keys and therefore can decrypt all data.

Alternatively, a public-key encryption method such as RSA can be used. In one embodiment, RSA is used if the time it takes for an attacker to decrypt the data exchanged initially is longer than it takes to establish the QKD link and exchange the first secure key. Once the first keys are exchanged, these keys are used for authentication and the QKD link is secure, even if the attacker decrypts the first data at a later time.

Alternatively, a trusted courier is used to establish the initial secret key. Instead of having a pre-stored key, a person physically transports a key from Alice to Bob, in order to start up the QKD link.

Authentication is performed over the classical channel. Authentication enables Alice and Bob to be sure that they are communicating with each other, and not with someone else. This prevents Eve from impersonating either Alice or Bob, thus making QKD insecure. At the first startup, a pre-stored key may be used for authentication until the QKD link has generated enough keys. For example, the manufacturer of Alice and Bob's devices may store a key of a certain length in both devices, which is used for the initial authentication. As only Alice and Bob know this secret key, they can use it to confirm that they are communicating with each other. Authentication may be performed by using hash functions in combination with the secret key for example.

Authentication can be performed for every data packet that is exchanged. In other words, authentication can be performed continuously using a small fraction of the generated secure keys.

If authentication is successful, in step S903, the receiver and transmitter perform an automatic start-up procedure to set up the quantum channel. To set up the quantum channel, the quantum receiver and quantum transmitter need to be aligned in time, and the phase and polarisation have to be set correctly. This is achieved by communication over the classical channel. If Bob and Alice wish to encrypt this information, it may also be encrypted using the pre-stored key, as discussed above.

After alignment is achieved, QKD runs continuously in parallel to any classical communication. Step S904 (secure key transmission) step S905 (encrypting of classical data and transmission) step S907 (decryption of classical data) and step S906 (QKD control transmissions, i.e. transmission of QKD control signals including feedback control, synchronisation, secure key sifting, error correction and privacy amplification) may all run continuously in parallel. The keys generated in S904 are stored in a memory and are used for classical communication. If either Alice or Bob want to send some data, they take some of the key, encrypt and transmit the data in step S905, and decrypt it using the same key in step S907.

Step S904, secure key transmission, corresponds to quantum signals being sent from the quantum transmitter to the quantum receiver, in order to form a key. The key may be formed using the BB84 protocol described above, or an alternative protocol.

The encryption keys generated in S904 are used to encrypt classical data in S905. The encryption keys may also be used to encrypt the transmission of QKD control signals in step S906.

In one embodiment, classical data is encrypted with one-time-pad encryption. The data is encrypted with a key of the same length as the data. If the encryption key is not re-used at a later time and stays secret, the encryption is unconditionally secure and can never be decrypted by an eavesdropper. In another embodiment, encryption keys shorter than the length of the data are used. The encryption might be based on the advanced encryption standard (AES).

Individual secret keys can be formed between the OLT and each of its connected ONUs using a QKD protocol such as BB84 described above. Each of the keys formed for each ONU is unique and secret from the other ONUs.

These keys can be used for subsequent cryptographic tasks such as the authentication and encryption of classical data sent between the ONU and OLT.

When the QKD links are operational, further keys are generated per user as required. These keys are used for the operation of the QKD systems themselves and any data that needs to be sent encrypted. This can include upstream data, which is harder to eavesdrop on. In one embodiment, only important data is encrypted, e.g. email communication, whereas other communications such as website information or videos would not be encrypted.

The classical data is transmitted over the network in step S905. This corresponds to classical signals being sent from the ONUs to the OLT and/or from the OLT to the ONUs.

The classical data is then decrypted in step S907.

The encryption and decryption of the classical data can run in parallel. While the recipient decrypts one message, at the same time the sender can encrypt the next one. The secure key is also used for decrypting.

FIG. 10A is a schematic illustration of a Gigabit-capable passive optical network. A Gigabit-capable passive optical network is an example of classical optical access network technology, in which a network node (OLT) is connected with several users (ONUs). A Gigabit-capable passive optical network works at Gigabit transmission speed. The signal distribution device connecting the users is passive (such as a passive optical splitter 103).

The OLT is connected to the passive signal distribution device 103 via a feeder fibre. The feeder fibre may also be referred to as a trunk fibre. It is the fibre link between the OLT and the passive splitter. The whole fibre network may also be referred to as an optical distribution network (ODN). The fibres between ONUs and splitter are referred to as distribution fibres.

Two standards which specify how such a network can be implemented, which are quite similar in their physical implementation, are: GPON and EPON. GPON (Gigabit passive optical network) has a downstream capacity of 2.5 Gb/s and an upstream capacity of 1.25 Gb/s. It is defined by International Telecommunications Union (ITU) in standard G.984. There is also a next generation standard working with 10 Gb/s downstream capacity and 2.5 Gb/s upstream capacity (G.987). EPON (Ethernet passive optical network) has a capacity of 1 Gb/s both downstream and upstream. It is defined by the Institute of Electrical and Electronic Engineers (IEEE) in standard 802.3. There is also a next generation standard with 10 Gb/s capacity (802.3). These standards are examples of how such a network can be implemented.

FIG. 10B shows a schematic illustration of a variation of the network, in which two separate feeder fibres 104-1 and 104-2 connect the OLT 105 to the passive optical splitter 103. Such a variation creates redundancy and protects against link failures. Two separate feeder fibres 104-1 and 104-2 may be connected to an OLT 105 which has two input ports. If one of the links (fibre feeders) is down, the system can switch over to the second one straight away. This dual feeder configuration can be implemented with a 2×N passive optical splitter.

A quantum communication system in accordance with an embodiment is compatible with a GPON network which implements this protection. The second feeder fibre can be used as a quantum communication channel.

In a quantum communication system, Raman noise may be particularly large relative to the quantum signal in the fibre that connects the OLT with the splitting unit, which in turn is connected to several endpoint users (ONUs). Separate transmission of quantum and classical signals will mean low noise in the quantum channel from Raman scattering.

A splitting unit such as described in relation to FIG. 3, 4 or 5 is not wavelength selective. This means that it does not reflect or transmit light depending on its wavelength. It does not select or split inputted optical signals based on the wavelength of the inputted optical signals. Inputted signals of all wavelengths are transmitted through the splitting unit in the same manner. The splitting unit processes inputted signals independently of their wavelength. This can be contrasted with splitting units used for wavelength-division multiplexing such as thin-film filters, fibre Bragg gratings or arrayed waveguide gratings, which are specifically designed to reject/reflect or transmit certain frequencies of light for multiplexing or de-multiplexing of several light signals.

Optical networks which permit transmission of a quantum signal separately from classical data signals e.g. on separate fibres, may use signal splitters or distributors which are wavelength dependent, i.e. which are specifically designed to reject/reflect or transmit certain wavelengths of light.

In a quantum communication system according to an embodiment, a wavelength independent component is used in the splitting unit between the OLT and the ONUs. For example, a splitting unit such as described in relation to FIG. 3, 4 or 5 may be used. A passive optical splitter which is wavelength independent can be widely used, with a large range of wavelengths, and allows cost-effective and simple optical networks. In one embodiment, in such devices, the signal distribution works correctly for any wavelength of quantum and classical signals.

In an embodiment, a quantum communication network may have optical fibres of up to 200 km. Fibre lengths in excess of 1 km, 10 km, 20 km may be used.

While certain embodiments have been described, these embodiments have been presented by way of example only, and are not intended to limit the scope of the inventions. Indeed the novel methods and apparatus described herein may be embodied in a variety of other forms; furthermore, various omissions, substitutions and changes in the form of methods and apparatus described herein may be made without departing from the spirit of the inventions. The accompanying claims and their equivalents are intended to cover such forms of modifications as would fall within the scope and spirit of the inventions.

The invention claimed is:

1. A quantum communication system, comprising:
   a plurality of transmitter units, each transmitter unit comprising a source of quantum signals;
   a receiver unit, comprising:
      a quantum receiver, comprising at least one detector configured to detect quantum signals; and
      a first classical communication device; and
   a passive optical splitter, wherein the plurality of transmitter units are optically coupled to the receiver unit through the passive optical splitter, wherein the passive optical splitter is optically coupled to the quantum receiver through a first spatial channel and optically coupled to the first classical communication device through a second spatial channel, wherein the first spatial channel and second spatial channel are separate spatial channels, and wherein the passive optical splitter is configured to distribute an inputted optical signal irrespective of its wavelength,
   wherein the passive optical splitter is configured such that the first spatial channel is optically coupled through the passive optical splitter to a plurality of spatial channels and the second separate spatial channel is optically coupled through the passive optical splitter to the same plurality of spatial channels.

2. The quantum communication system according to claim 1, wherein each transmitter unit comprises a second classical communication device, which comprises a detector configured to detect classical signals, and wherein the first classical communication device comprises a source of classical signals.

3. The quantum communication system according to claim 2, wherein the receiver unit comprises a timing control circuitry, configured to allow only a single transmitter unit to emit a quantum signal for each arrival time at the quantum receiver, the timing control circuitry also allowing the transmitter unit which sent the quantum signal to be identified.

4. The quantum communication system according to claim 3, wherein the first classical communication device is configured to receive a signal from the timing control circuitry and send the signal to the second classical communication device through the second spatial channel.

5. The quantum communication system according to claim 1, wherein the passive optical splitter comprises at least two waveguides which are evanescently coupled.

6. The quantum communication system according to claim 1, wherein the passive optical splitter comprises at least one multi-mode interference section.

7. The quantum communication system according to claim 1, wherein the first spatial channel comprises a first optical fibre and the second spatial channel comprises a second optical fibre.

8. The quantum communication system according to claim 1, where the first spatial channel and the second spatial channel comprise first and second spatial modes in an optical waveguide configured to transmit a plurality of spatial modes.

9. The quantum communication system according to claim 8, further comprising a spatial mode de-multiplexer, wherein the quantum receiver and first classical communication device are optically coupled to the passive optical splitter through the spatial mode de-multiplexer.

10. The quantum communication system according to claim 1, wherein the first spatial channel and the second spatial channel comprise first and second cores in a multi-core optical fibre.

11. The quantum communication system according to claim 10, further comprising a fibre fan-out, wherein the quantum receiver and first classical communication device are optically coupled to the passive optical splitter through the fibre fan-out.

12. The quantum communication system according to claim 2, wherein a classical communication system between the first classical communication device and the second classical communication device is a gigabit-capable passive optical network.

13. The quantum communication system according to claim 2, wherein the receiver unit comprises a decoder and the transmitter units each comprise an encoder, configured to generate an encryption key between the receiver unit and each transmitter unit.

14. The quantum communication system of claim 13, wherein each transmitter unit comprises a circuitry configured to encrypt classical data using the generated encryption key, and wherein the second classical communication device is configured to send the encrypted classical data to the first classical communication device through the second spatial channel, and wherein the receiver unit comprises a circuitry configured to decrypt the encrypted data received by the first classical communication device using the generated encryption key.

15. The quantum communication system of claim 13, wherein the receiver unit comprises a circuitry configured to encrypt classical data using the generated encryption key, and wherein the first classical communication device is configured to send the encrypted classical data to the second classical communication device through the second spatial channel, and wherein each transmitter unit comprises a circuitry configured to decrypt the encrypted data received by the second classical communication device using the generated encryption key.

16. A quantum communication system according to claim 3, wherein the detector is a gated detector and the timing control circuitry is configured to synchronise gating of the detector with the arrival time of signals from the transmitter units.

17. A quantum communication system according to claim 1, wherein the receiver unit comprises a feedback control unit configured to generate a feedback signal for each transmitter unit, and wherein the first classical communication device is configured to transmit the feedback signal to each transmitter unit, each transmitter unit comprising a control element configured to be controlled by the feedback signal.

18. A quantum communication system according to claim 17, wherein the control element is a time control of the source of quantum signals.

19. A quantum communication method for communicating over a system comprising a receiver unit, the receiver unit comprising a source of classical signals and the receiver unit further comprising a quantum receiver, the quantum receiver comprising at least one detector configured to detect quantum signals; the system further comprising a plurality of transmitter units, each transmitter unit comprising a detector configured to detect classical signals and each transmitter unit further comprising a source of quantum signals; and the system further comprising a passive optical splitter, wherein the plurality of transmitter units are optically coupled to the receiver unit through the passive optical splitter; the method comprising the steps of:

sending quantum signals from the plurality of transmitter units to the passive optical splitter;

distributing the quantum signals into a first spatial channel and a second spatial channel, wherein the first spatial channel and second spatial channel are separate spatial channels, irrespective of a wavelength of the quantum signals;

receiving the quantum signals from the first spatial channel at the quantum receiver;

sending a classical signal from the receiver unit to the passive optical splitter through the second spatial channel;

distributing the classical signal to the plurality of transmitter units, irrespective of a wavelength of the classical signal;

wherein the passive optical splitter is optically coupled to the quantum receiver through the first spatial channel and optically coupled to a first classical communication device through the second spatial channel, and wherein the passive optical splitter is configured such that the first spatial channel is optically coupled through the passive optical splitter to a plurality of spatial channels and the second separate spatial channel is optically coupled through the passive optical splitter to the same plurality of spatial channels.

* * * * *